United States Patent
Kanno

(10) Patent No.: US 10,635,310 B2
(45) Date of Patent: Apr. 28, 2020

(54) STORAGE DEVICE THAT COMPRESSES DATA RECEIVED FROM A HOST BEFORE WRITING THEREIN

(71) Applicant: Toshiba Memory Corporation, Tokyo (JP)

(72) Inventor: Shinichi Kanno, Ota Tokyo (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 260 days.

(21) Appl. No.: 15/446,796

(22) Filed: Mar. 1, 2017

(65) Prior Publication Data
US 2018/0088811 A1  Mar. 29, 2018

(30) Foreign Application Priority Data
Sep. 23, 2016  (JP) ................... 2016-185486

(51) Int. Cl.
*G06F 12/00* (2006.01)
*G06F 3/06* (2006.01)
*G06F 12/02* (2006.01)

(52) U.S. Cl.
CPC .......... *G06F 3/0604* (2013.01); *G06F 3/0608* (2013.01); *G06F 3/0638* (2013.01); *G06F 3/0659* (2013.01); *G06F 3/0679* (2013.01); *G06F 12/0246* (2013.01); *G06F 2212/1044* (2013.01); *G06F 2212/214* (2013.01); *G06F 2212/401* (2013.01); *G06F 2212/7201* (2013.01); *G06F 2212/7205* (2013.01)

(58) Field of Classification Search
CPC ................. G06F 12/12; G06F 12/0897; G06F 2212/1041; G06F 2212/608
See application file for complete search history.

(56) References Cited

U.S. PATENT DOCUMENTS

| | | | |
|---|---|---|---|
| 6,243,081 B1 | 6/2001 | Goris et al. | |
| 9,152,554 B2 | 10/2015 | Uno | |
| 9,158,695 B2 | 10/2015 | Simionescu et al. | |
| 9,400,609 B1* | 7/2016 | Randall | .................. G06F 3/064 |
| 2008/0028180 A1* | 1/2008 | Newman | ............. G06F 12/1416 |
| | | | 711/206 |

(Continued)

FOREIGN PATENT DOCUMENTS

| | | | |
|---|---|---|---|
| JP | 2000-105839 A | 4/2000 | |
| JP | 2013161447 A | 8/2013 | |

(Continued)

*Primary Examiner* — Gurtej Bansal
(74) *Attorney, Agent, or Firm* — Kim & Stewart LLP

(57) ABSTRACT

A storage device includes a nonvolatile storage and a controller. The controller is configured to compress data received from a host in association with a write command designating a first data length as a length of the data and a starting logical address of the data, into compressed data of a second data length shorter than the first data length, write the compressed data in the nonvolatile storage. Further, the controller is configured to generate an address mapping for the data, such that a first logical address range that starts at the starting logical address is mapped to a physical region of the nonvolatile storage having a size equal to the second data length, and a second logical address range that directly follows the first logical address range is not mapped to any physical region of the nonvolatile storage.

17 Claims, 25 Drawing Sheets

(56) References Cited

U.S. PATENT DOCUMENTS

| | | |
|---|---|---|
| 2013/0246721 A1 | 9/2013 | Fukutomi et al. |
| 2014/0101379 A1 | 4/2014 | Tomlin |
| 2014/0215170 A1* | 7/2014 | Scarpino ............... G06F 3/0608 711/161 |
| 2015/0067239 A1* | 3/2015 | Chu .................... G06F 12/0246 711/103 |
| 2016/0004642 A1* | 1/2016 | Sugimoto ................. G06F 3/06 711/128 |

FOREIGN PATENT DOCUMENTS

| | | |
|---|---|---|
| JP | 2014052899 A | 3/2014 |
| WO | 2015/087424 A1 | 6/2015 |

\* cited by examiner

MANAGEMENT INFORMATION

| START LBA | UNCOMPRESSED DATA LENGTH | COMPRESSED DATA LENGTH | COMPRESSION METHOD | COMPRESSION FLAG |
|---|---|---|---|---|
| LBA#A | 1MB | 500KB | #1 | 0 (=COMPRESSION) |
| LBA#B | 1MB | 400KB | #1 | 0 (=COMPRESSION) |
| LBA#C | 2MB | 900KB | #2 | 0 (=COMPRESSION) |
| | | | | 0 (=COMPRESSION) |
| | | | | |

FIG. 11

WRITE COMMAND

| PARAMETER | DESCRIPTION |
|---|---|
| START LBA | START LBA OF DATA TO BE WRITTEN |
| DATA LENGTH (NUMBER OF LOGICAL BLOCKS) | LENGTH OF DATA TO BE WRITTEN (NUMBER OF LOGICAL BLOCKS CORRELATED WITH DATA TO BE WRITTEN) MINIUM DATA LENGTH IS DATA LENGTH LARGER THAN MANAGEMENT DATA SIZE (EX. 1MB) DESIGNATION OF LENGTH OF INTEGER MULTIPLE OF MINIMUM DATA LENGTH IS AVAILABLE |
| COMPRESSION MODE | 00: DEFAULT COMPRESSION METHOD 01: COMPRESSION METHOD #1 10: COMPRESSION METHOD #2 11: NO COMPRESSION |

FIG. 12

EXTENSION NAMESPACE MANAGEMENT COMMAND

| PARAMETER | DESCRIPTION |
|---|---|
| CREATE/DELETE | 0: CREATE 1: DELETE |
| NUMBER OF LOGICAL BLOCKS | 0~N-1 |
| PHYSICAL RESOURCE SIZE | NUMBER OF PHYSICAL BLOCKS TO BE RESERVED |
| COMPRESSION MODE | 00: DEFAULT COMPRESSION METHOD 01: COMPRESSION METHOD #1 10: COMPRESSION METHOD #2 11: NO COMPRESSION |

FIG. 13

READ COMMAND

| PARAMETER | DESCRIPTION |
| --- | --- |
| START LBA | START LBA OF DATA TO BE READ |
| DATA LENGTH (NUMBER OF LOGICAL BLOCKS) | LENGTH OF DATA TO BE READ (NUMBER OF LOGICAL BLOCKS CORRELATED WITH DATA TO BE READ)<br>*TYPICALLY, PAIR OF START LBA AND DATA LENGTH IS THE SAME AS PAIR OF START LBA AT TIME OF WRITING AND DATA LENGTH |

FIG. 15

WRITE COMMAND FOR NAMESPACE

| PARAMETER | DESCRIPTION |
|---|---|
| START LBA | START LBA OF DATA TO BE WRITTEN |
| DATA LENGTH (NUMBER OF LOGICAL BLOCKS) | LENGTH OF DATA TO BE WRITTEN (NUMBER OF LOGICAL BLOCKS CORRELATED WITH DATA TO BE WRITTEN)<br>MINIMUM DATA LENGTH IS DATA LENGTH LARGER THAN MANAGEMENT SIZE (EX. 1MB)<br>LENGTH OF INTEGER MULTIPLE OF MINIMUM DATA LENGTH CAN BE DESIGNATED |
| NSID | ID OF NAMESPACE |

FIG. 22

GC COUNT MANAGEMENT LIST

| GC COUNT | Blocks |
|---|---|
| =0 | block, block, block |
| =1 | block, block, block |
| =2 | block, block, block |
| =3 | block, block, block |
| =4 | block, block, block, block |
| =5 | block, block, block, block |
| =6 | block, block, block |
| =7 | block, block, block, block |
| =8 | block, block, block, block |
| =9 | block, block, block, block |
| =10 | block, block, block |

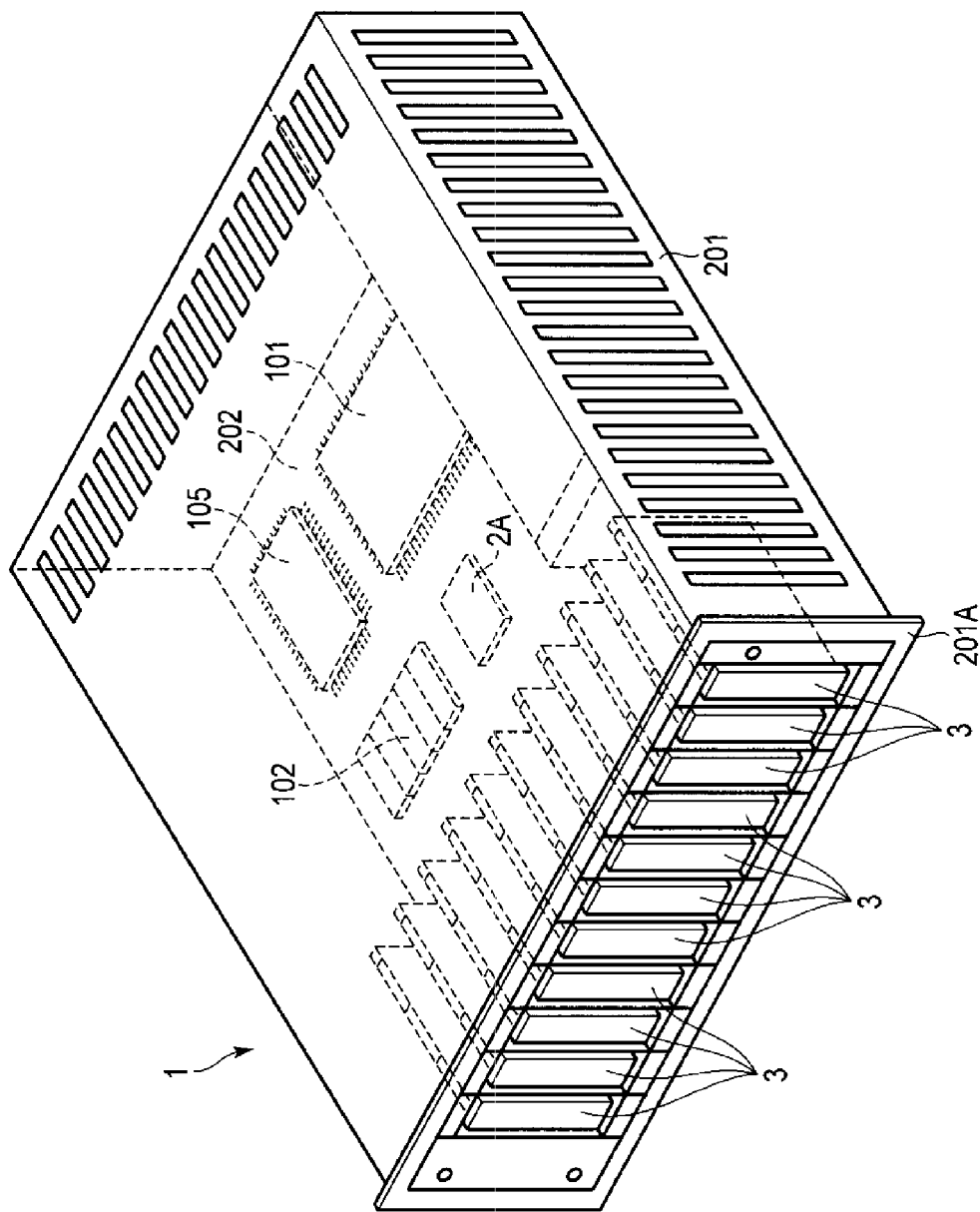

STORAGE DEVICE THAT COMPRESSES DATA RECEIVED FROM A HOST BEFORE WRITING THEREIN

CROSS-REFERENCE TO RELATED APPLICATION

This application is based upon and claims the benefit of priority from Japanese Patent Application No. 2016-185486, filed Sep. 23, 2016, the entire contents of which are incorporated herein by reference.

FIELD

An embodiment relates to a technique for controlling a nonvolatile memory.

BACKGROUND

Today, a storage system including a nonvolatile memory is widely used. One of such storage systems includes a NAND-flash-type solid state drive (SSD). The SSD is used as main storage of various computing devices for its low power consumption and high-speed performance.

The SSD is also widely used in a storage server. A storage server having a data compression function is developed in order to efficiently manage a large number of data and various kinds of data. The storage server having the data compression function compresses data to be written to the SSD, and sends a request for writing the compressed data to the SSD.

The length (data length) of compressed data is different from the length (data length) of uncompressed data (original data). In addition, the data length of the compressed data obtained by compressing the original data is different depending on the type of the original data. For that reason, the storage server needs to manage the compressed data length with respect to each piece of data, in order to access each piece of data stored in the SSD. This can cause increase in a burden of data management on the server side.

DESCRIPTION OF THE DRAWINGS

FIG. 11 illustrates contents of a write request (write command) which is applied to the memory storage according to the embodiment.

FIG. 12 illustrates contents of an extension namespace management command which is applied to the storage system according to the embodiment.

FIG. 13 illustrates contents of a read request (read command) which is applied to the storage system according to the embodiment.

FIG. 15 illustrates contents of a write request (write command) for namespace which is applied to the storage system according to the embodiment.

FIG. 22 illustrates an example of a garbage collection count management list used in the storage system according to the embodiment.

FIG. 27 illustrates a configuration of a computer including the storage system according to the embodiment and the host.

DETAILED DESCRIPTION

An embodiment provides a storage device and a control method, which are able to manage compressed data of which data length is variable.

According to an embodiment, a storage device includes a nonvolatile storage and a controller. The controller is configured to compress data received from a host in association with a write command designating a first data length as a length of the data and a starting logical address of the data, into compressed data of a second data length shorter than the first data length, write the compressed data in the nonvolatile storage. Further, the controller is configured to generate an address mapping for the data, such that a first logical address range that starts at the starting logical address is mapped to a physical region of the nonvolatile storage having a size equal to the second data length, and a second logical address range that directly follows the first logical address range is not mapped to any physical region of the nonvolatile storage.

Below, embodiments will be described with reference to the drawings.

Figure 1:
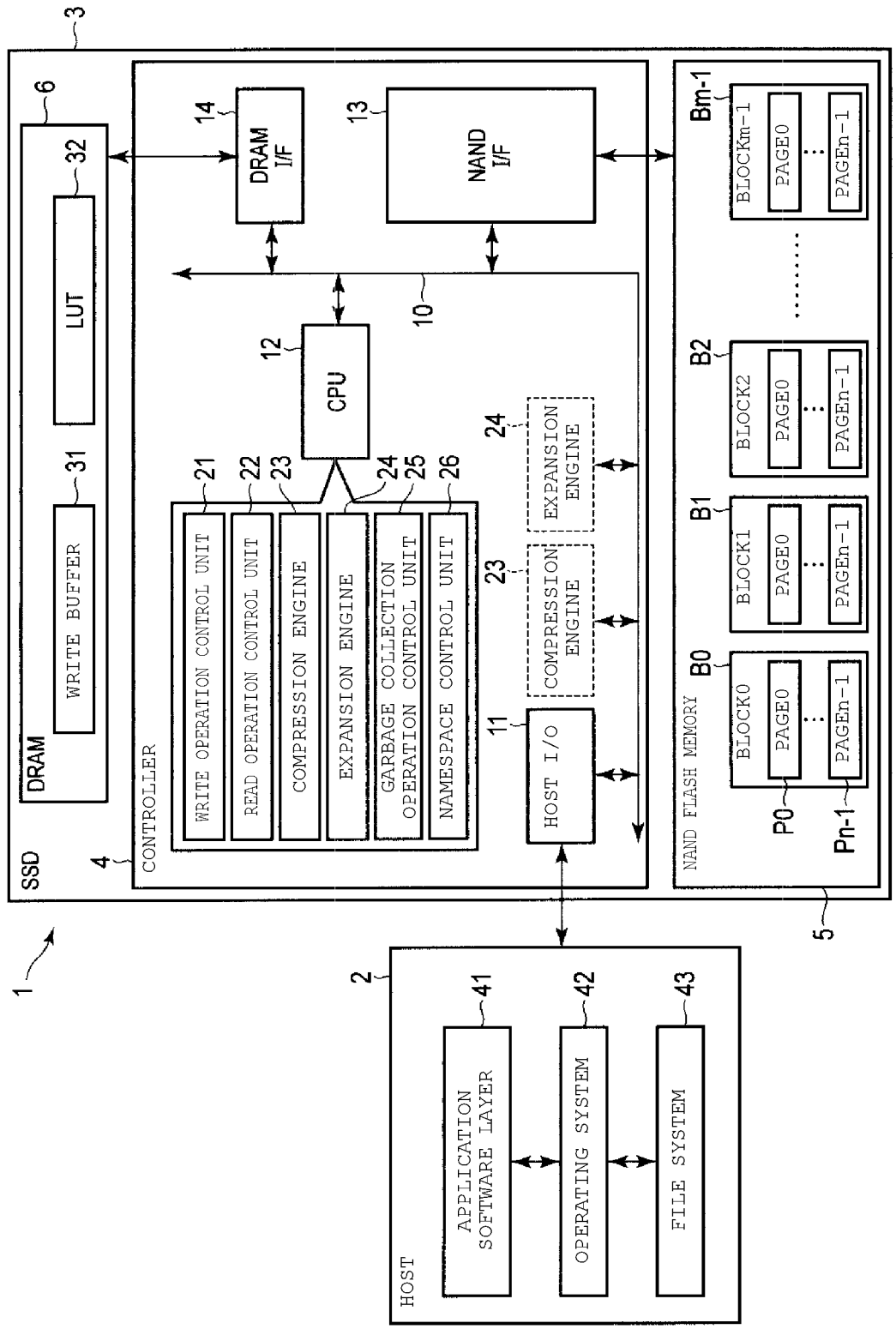
FIG. 1 is a block diagram of a storage system according to an embodiment.

First, a configuration of an information processing system 1 including a memory system according to an embodiment will be described with reference to FIG. 1.

The memory system is a semiconductor storage device configured to write data to a nonvolatile memory and read data from the nonvolatile memory. The memory system is formed as, for example, a NAND-flash-type solid state drive (SSD) 3.

The information processing system 1 includes a host (host device) 2 and the SSD 3. The host 2 is an information processing apparatus (computing device) that accesses the SSD 3. The host 2 may be a storage server (server) that stores a large number of various pieces of data in the SSD 3, or a personal computer.

The SSD 3 can be used as a main storage of the information processing apparatus functioning as the host 2. The SSD 3 may be built in the information processing apparatus, or may be externally connected to the information processing apparatus through a cable or a network.

As the interface for interconnecting the host 2 and the SSD 3, SCSI, Serial Attached SCSI (SAS), ATA, Serial ATA (SATA), PCI Express (PCIe), Ethernet®, Fibre channel, NVM Express® (NVMe) or the like may be used.

The SSD 3 includes a controller 4 and a nonvolatile memory (NAND flash memory) 5. The SSD 3 may also include a DRAM 6. The NAND flash memory 5 may include a plurality of NAND flash memory chips. The NAND flash memory 5 includes a memory cell array. The memory cell array includes a large number of NAND blocks (blocks) B0 to Bm−1. The blocks B0 to Bm−1 function as units of erasing data. The blocks may be referred to as "physical block" or "erase block".

The blocks B0 to Bm−1 each include a large number of pages (physical pages). In other words, each of the blocks B0 to Bm−1 includes pages P0 to Pn−1. In the NAND flash memory 5, data reading and data writing are performed in units of a page. Data erasing is performed in units of a block.

The controller 4 is electrically connected to the NAND flash memory 5 which is a nonvolatile memory, through a NAND interface 13 such as Toggle and ONFI. The controller 4 is able to function as a flash translation layer (FTL) that is configured to perform a data management of the NAND flash memory 5 and a block management of the NAND flash memory 5.

The data management includes (1) management of a mapping information indicating correspondence between each logical address and a physical address of the NAND flash memory 5, (2) processing for hiding the read/write in units of a page and an erasing operation in units of a block. A logical address is an address used by a host to address the SSD 3. As the logical address, a logical block address (LBA) is usually used. In the following, it is assumed that the logical address is a logical block address (LBA).

The management of mapping between each logical block address (LBA) and a physical address corresponding thereto is performed using a lookup table (LUT) 32 functioning as an address translation table (logical physical address translation table). The controller 4 manages a mapping between each LBA and a physical address corresponding thereto, using the lookup table (LUT) 32, in a predetermined management size unit. Any other management size units, thought not to be limited, for example, 4K bytes may be used. The address translation table (LUT 32) may be loaded to the DRAM 6 from the NAND flash memory 5 when the SSD 3 is powered ON.

The physical address correlated with a certain LBA indicates a physical storage position within the NAND flash memory 5 to which data associated with the LBA data are written. The physical address includes a physical block address and a physical page address. The physical page address is allocated to every page, and the physical block address is allocated to every block.

Only one time of data writing to the page is possible per a single erase cycle. For that reason, the controller 4 maps writing (overwriting) to the same LBA to a different page on the NAND flash memory 5. That is, the controller 4 writes data (write data) designated by the write command received from the host 2 to the next available page within the currently allocated block as a write destination block, regardless of the LBA. The controller 4 updates the lookup table (LUT) 32, and associates the LBA with the physical address of the page to which the data are written. If there is no available page in the write destination block, a new block is allocated as a write destination block.

The block management includes management of a bad block, wear leveling, garbage collection, and the like.

The host 2 sends a read request (read command), a write request (a write command), and other various requests (other various commands) to the SSD 3. A read command is a command requesting for data reading to the SSD 3. The read command includes an LBA (start LBA) of data to be read, and a data length (transfer length) of the data to be read. A write command is a command requesting for data writing to the SSD 3. The write command includes the LBA (start LBA) of write data (that is, data to be written) and the data length (transfer length) of the write data.

Next, a configuration of the controller 4 will be described.

The controller 4 includes a host interface 11, a CPU 12, a NAND interface 13, a DRAM interface 14, and the like. The CPU 12, the NAND interface 13, and the DRAM interface 14 are interconnected through a bus 10.

The host interface 11 receives various commands (for example, a write command, a read command, an erase command, an unmap/trim command, and the like) from the host 2.

The CPU 12 is a processor configured to control the host interface 11, the NAND interface 13, and the DRAM interface 14. The CPU 12 executes a command process or the like for processing various commands received from the host 2, in addition to an FTL process as the flash translation layer.

The command process has a write process including a data compression function, and a read process including a data expansion function. The data compression/expansion function may be performed by the CPU 12, or by dedicated hardware.

The FTL process and the command process may be controlled in accordance with a firmware that is executed by the CPU 12. This firmware causes the CPU 12 to function as a write operation control unit 21, a read operation control unit 22, a compression engine 23, an expansion engine 24, a garbage collection operation control unit 25, and a namespace control unit 26.

The write operation control unit 21 receives write data from the host 2, in response to reception of a write request (write command) from the host 2. The write operation control unit 21 compresses write data using the compression engine 23, and writes the compressed data to the memory area within the NAND flash memory 5. In the present embodiment, a minimum data length of write data to be compressed is set to a data length larger than the management size (for example, 4 KB). For example, the minimum data length of write data may be 1 M byte. The host 2 is able to send a request for writing data having a data length of an integer multiple of the minimum data length to the SSD 3. Limiting the minimum data length of write data to be compressed to a data length larger than the management size (for example, 4 KB) does not lead to increase in the size of the address translation table (LUT32) stored in the NAND flash memory 5, and thus it is possible to efficiently manage each physical storage position in which the compressed data of having a changed data length is stored.

If a configuration of compressing, for example, the host data of 4 KB is adopted, it is necessary to manage the physical storage position of the compressed data that is smaller than 4 KB by compression in a management size unit which is smaller than 4 KB. In this case, the address translation table of a very large size would be needed. In general, the size of the address translation table is proportional to the capacity of the SSD. Thus, in the configuration in which the address translation information is managed in a small management size unit, it is difficult to form a large capacity of SSD.

The write operation control unit 21 manages the compressed write data in the following manner, because the data length of uncompressed data (write data) and the data length of the compressed write data do not match.

In other words, the write operation control unit 21 updates the LUT 32 based on a difference between the data length of the write data and the data length of the compressed data, maps each physical address in a physical storage area to which the compressed data are written, to each LBA in a first range which starts at a start LBA of a first LBA range to which the write data are to be written and that is correlated with the data length of the compressed data, and sets each LBA in a second range which is subsequent to the first range and is correlated with the difference between the data length of the write data and the data length of the compressed data, to a state where the physical addresses are not mapped (also referred to as "unmapped state" or "deallocated state"). As a result, even if, for example, the write data have a certain length by compression, since the first LBA range does not change and only the ratio of the first range to the second range in the first LBA range changes, the host 2 is able to execute the read and write (rewriting) of the data, using the LBA range (first LBA range) correlated with the data length of the uncompressed data.

In this way, the host 2 is able to easily address compressed data, only by using an LBA range (a first LBA range) correlated with the uncompressed data (write data), regardless of the actual data length of the compressed data.

If the first logical address range is designated as a logical address range for the read target in response to the read request (read command) from the host 2, the read operation control unit 22 reads the compressed data from the NAND flash memory 5, based on each physical address which is mapped to each logical address in the first range. Then, the read operation control unit 22 expands the read compressed data to data having the same data length as the uncompressed data using the expansion engine 24, and returns the data obtained by the expansion, to the host 2 through the host interface 11.

The compression engine 23 is configured to reversibly compress the data. The compression engine 23 maybe configured to support a plurality of types of compression methods, or may compress the data using any one of the plurality of types of compression methods. The compression method to be used may be designated by the host 2.

The expansion engine 24 is configured to expand the compressed data. The expansion engine 24 is able to perform a plurality of types of expansion processes correlated with the plurality of types of compression methods.

The garbage collection (GC) operation control unit 25 copies all pieces of valid data in some blocks in which the valid data and invalid data coexist to another block (copy destination free block) in order to increase the number of free blocks in the NAND flash memory 5. The GC operation control unit 25 updates the lookup table (LUT) 32, and copies each LBA of the copied valid data to a correct physical address. A block which is filled with only invalid data, by the valid data being copied to another block, is remapped as a free block. Thus, after the erasing operation of the block is performed, the block can be reused.

In the GC operation to copy the valid data, the garbage collection (GC) operation control unit 25 may generate compressed data of a shorter data length by recompressing the compressed valid data using the compression engine 23, and copy the generated compressed data to the copy destination free block. Since this operation decreases the amount of data to be copied during the GC operation, write amplification of the SSD 3 can be reduced.

In general, the data compression process with a high compression rate requires a processing time greater than the data compression process with a low compression rate. For that reason, the GC operation along with the data recompression process is particularly useful for the GC operation performed during an idle period of the host 2.

The namespace control unit 26 is able to support a multi-namespace function of managing a plurality of namespaces. According to the multi-namespace function, each of a plurality of logical address spaces (LBA spaces) is correlated with one of a plurality of namespaces, in order to allow a single storage device (here, the SSD 3) to be handled as a plurality of drives. The LBA range (LBA0 to LBAn−1) is allocated to each namespace. The size of the LBA range (in other words, the number of LBAs) may be variable for each namespace. Each LBA range starts at the LBA0. In addition, the namespace control unit 26 may manage individually a mapping between each LBA and a physical address corresponding thereto for each namespace, using a different LUT for each namespace.

The namespace control unit 26 is able to associate either a compression mode or a non-compression mode with each of the plurality of namespaces, based on a request from the host 2 that designates compression or non-compression for each namespace. The write command contains a namespace ID for designating a namespace to which data are to be written. When the compression mode is associated with the namespace correlated with the namespace ID in the write command, the write operation control unit 21 of the controller 4 compresses the write data designated by the write command and writes the compressed write data to the NAND flash memory 5. In contrast, when the non-compression mode is associated with the namespace correlated with the namespace ID in the write command, the write operation control unit 21 writes the write data to the NAND flash memory 5, without compressing the write data.

In this way, in the present embodiment, the functions of data compression and management of the compressed data are performed by the SSD 3. It is possible to reduce the physical memory capacity of the NAND flash memory 5 required to store data, according to the data compression function. If it is assumed that an average compression rate is 50%, the SSD 3 is able to store an amount of data twice the capacity of the SSD 3 (physical capacity). For that reason, the SSD 3 may report an LBA space larger than the capacity of the SSD 3 (physical capacity) as the capacity of the SSD 3 to the host 2, and thereby may operate as a thin provisioned storage device. For example, if the capacity of the SSD 3 (physical capacity) is 2 T bytes, the controller 4 of the SSD 3 may report 4 TB as the capacity of the SSD 3 to the host 2. If the actual compression rate is smaller than the expected compression rate (for example, 50 percent), there is also a possibility that a physical storage area necessary for storing the write requested data cannot be reserved. In this case, the controller 4 may notify the host 2 of a write error.

In addition, it is also possible to reduce the write amplification of the SSD 3, by using a data memory space which is increased by data compression, as a work area for the garbage collection. In other words, since the physical memory capacity required to store the host data can be reduced by the data compression, the frequency of the garbage collection can be reduced as well. As a result, it is possible to reduce the write amplification of the SSD 3.

The processes to be offloaded from the host 2 to the SSD 3 include the following processes.

(1) Data Compression and Expansion Process (2) Management Process of Compressed Data with Variable Length The data compression and expansion process may be executed by the CPU 12, or may be executed by the compression engine 23 and the expansion engine 24 which are respectively configured with dedicated hardware.

Usually, in a case where the host 2 performs data compression, it is necessary to perform management of metadata such as the compressed data length on the host 2 side. There may also be a case where the host 2 needs to perform a type of garbage collection of moving the compressed data that is associated with a certain LBA range to another LBA range, in order to eliminate fragmentation of LBA spaces. The amount of data to be written to the SSD 3 also increases due to the garbage collection on the host 2 side, and thus the physical memory capacity of the SSD 3 is consumed quickly. As a result, the frequency of the garbage collection operations performed by the SSD 3 is also increased.

Next, a configuration of the host 2 will be described.

The host 2 is an information processing device that executes a variety of software programs. The software programs executed by the information processing apparatus include an application software layer 41, an operating system (OS) 42, and a file system 43.

As commonly known, the operating system (OS) 42 is software configured to manage entire host 2, control the hardware in the host 2, and execute control allowing the application to use hardware and the SSD 3.

The file system 43 is used to perform the control for operation (create, store, update, delete, or the like) of a file. For example, ZFS, Btrfs, XFS, ext4, NTFS, and the like may be used as the file system 43. Alternatively, the file object system (for example, Ceph Object Storage Daemon), Key Value Store System (for example, Rocks DB) may be used as the file system 43.

Various application software threads run on the application software layer 41. Examples of the application software threads include client software, database software, virtual machine, or the like.

When the application software layer 41 needs to send a request such as a read command or a write command to the SSD 3, the application software layer 41 sends the request to the OS 42. The OS 42 sends the request to the file system 43. The file system 43 translates the request to a command (a read command, a write command, or the like). The file system 43 sends the command to the SSD 3. When a response is received from the SSD 3, the file system 43 sends the response to the OS 42. The OS 42 sends the response to the application software layer 41.

Figure 2:
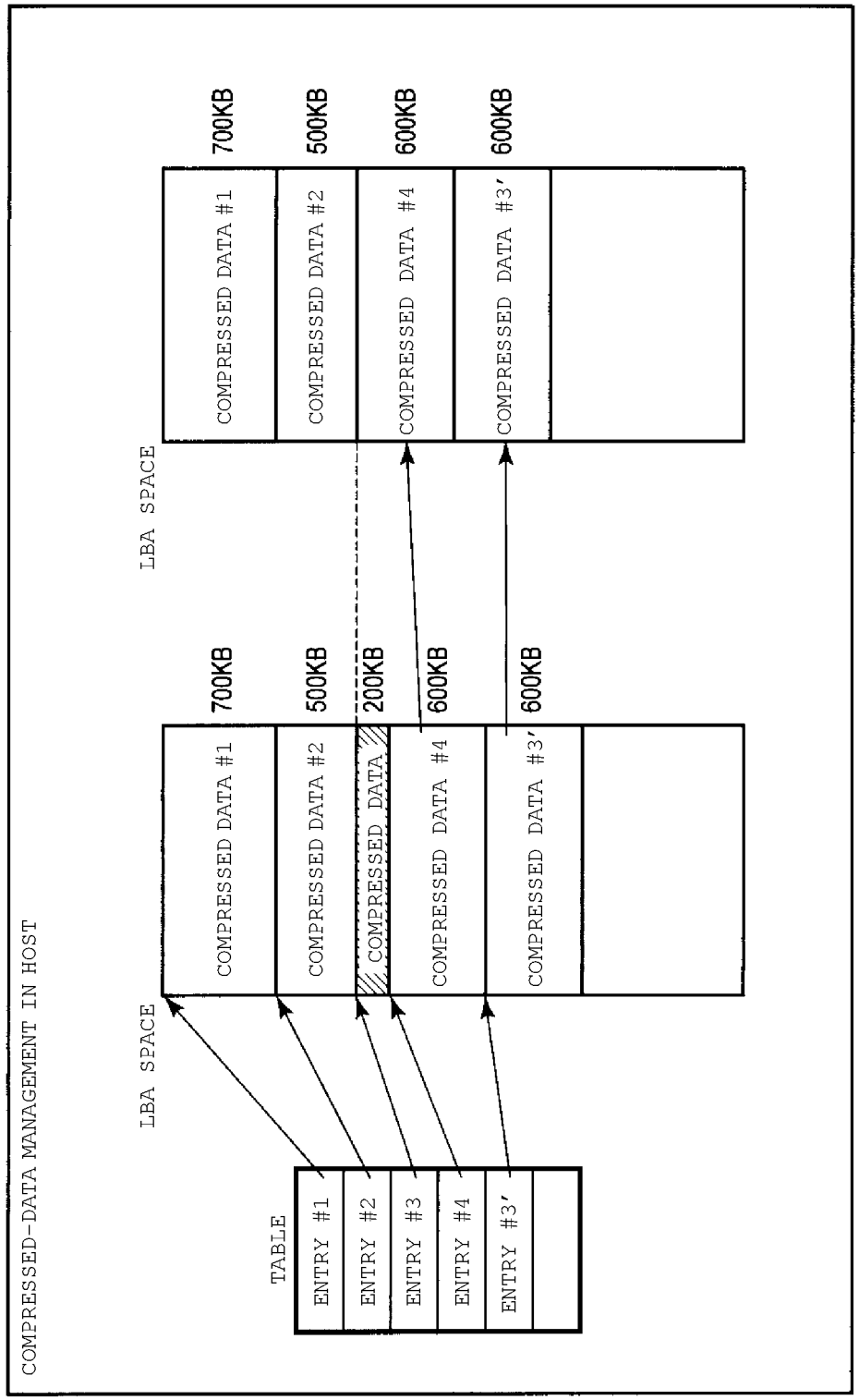
FIG. 2 illustrates compressed-data management carried out by a host that is required in a system configuration in which data compression is executed on the host.

FIG. 2 illustrates compressed-data management on a host side that is carried out in a system configuration in which data compression is executed on the host side, which is different from the system configuration according to the present embodiment.

Here, it is assumed that the host compresses data #1, data #2, data #3, and data #4, respectively, and writes the compressed data #1, the compressed data #2, the compressed data #3, and the compressed data #4 to the SSD. Further, in order to simplify the description, it is assumed that the data lengths of the data #1, the data #2, the data #3, and the data #4 before compression are the same data length (for example, 1 MB).

When the compressed data #1 of 700 KB is obtained by compressing the data #1 of 1 MB, the host associates the compressed data #1 with a LBA range of 700 KB, registers the start LBA of the LBA range at the entry #1 of a table, and sends a request for writing the compressed data #1 to the SSD.

Next, when the compressed data #2 of 500 KB is obtained by compressing the data #2 of 1 MB, the host associates the compressed data #2 with a LBA range of 500 KB which is subsequent to the LBA range of 700 KB, registers the start LBA of the LBA range of 500 KB at the entry #2 of a table, and sends a request for writing the compressed data #2 to the SSD.

Next, when the compressed data #3 of 200 KB is obtained by compressing the data #3 of 1 MB, the host associates the compressed data #3 with a LBA range of 200 KB which is subsequent to the LBA range of 500 KB, registers the start LBA of the LBA range of 200 KB to at entry #3 of a table, and sends a request for writing the compressed data #3 to the SSD.

Next, when the compressed data #4 of 600 KB is obtained by compressing the data #4 of 1 MB, the host associates the compressed data #4 with a LBA range of 600 KB which is subsequent to the LBA range of 200 KB, registers the start LBA of the LBA range of 600 KB at the entry #4 of a table, and sends a request for writing the compressed data #4 to the SSD.

Thereafter, the host may update, for example, the data #3. The data length of the compressed data #3' obtained by compressing the updated data #3' of 1 MB may be larger than 200 KB. For example, when the compressed data #3' of 600 KB is obtained by compressing the data #3' of 1 MB, the host 2 is not able to associate the compressed data #3' with the LBA range of 200 KB of the compressed data #3. Therefore, the host associates the compressed data #3' with a new LBA range of 600 KB which is subsequent to the LBA range of 600 KB for the compressed data #4, registers the start LBA of the new LBA range of 600 KB at the next entry (entry #3') of a table, and sends a request for writing the compressed data #3' to the SSD. The LBA range of 200 KB of the compressed data #3 is the LBA range in which no valid data are allocated.

Since the size of the LBA space is limited, either remaining LBA range is not sufficient. The host needs to move the compressed data #4 and the compressed data #3', as illustrated in the right part of FIG. 4, in order to reserve a wide remaining LBA range by defragmenting the LBA space. In this case, first, the host associates the compressed data #4 with a LBA range of 600 KB, starting from the start LBA of the LBA range of 200 KB correlated with the compressed data #3, and sends a request for writing the compressed data #4 to the SSD. Thereafter, the host associates the compressed data #3' with a LBA range of 600 KB which is subsequent to the LBA range of 600 KB correlated with the compressed data #4 which is moved, and sends a request for writing the compressed data #3' to the SSD.

In this way, even though the host only intends to rewrite the compressed data #3 to the compressed data #3', because the data length of the compressed data #3' is greater than the compressed data #3, the host needs to carry out various tasks such as writing of the compressed data #3' to a new LBA range which is different from the LBA range for the compressed data #3, rewriting of the compressed data #4 for moving the compressed data #4, and rewriting of the compressed data #3' for moving the compressed data #3'.

Figure 3:
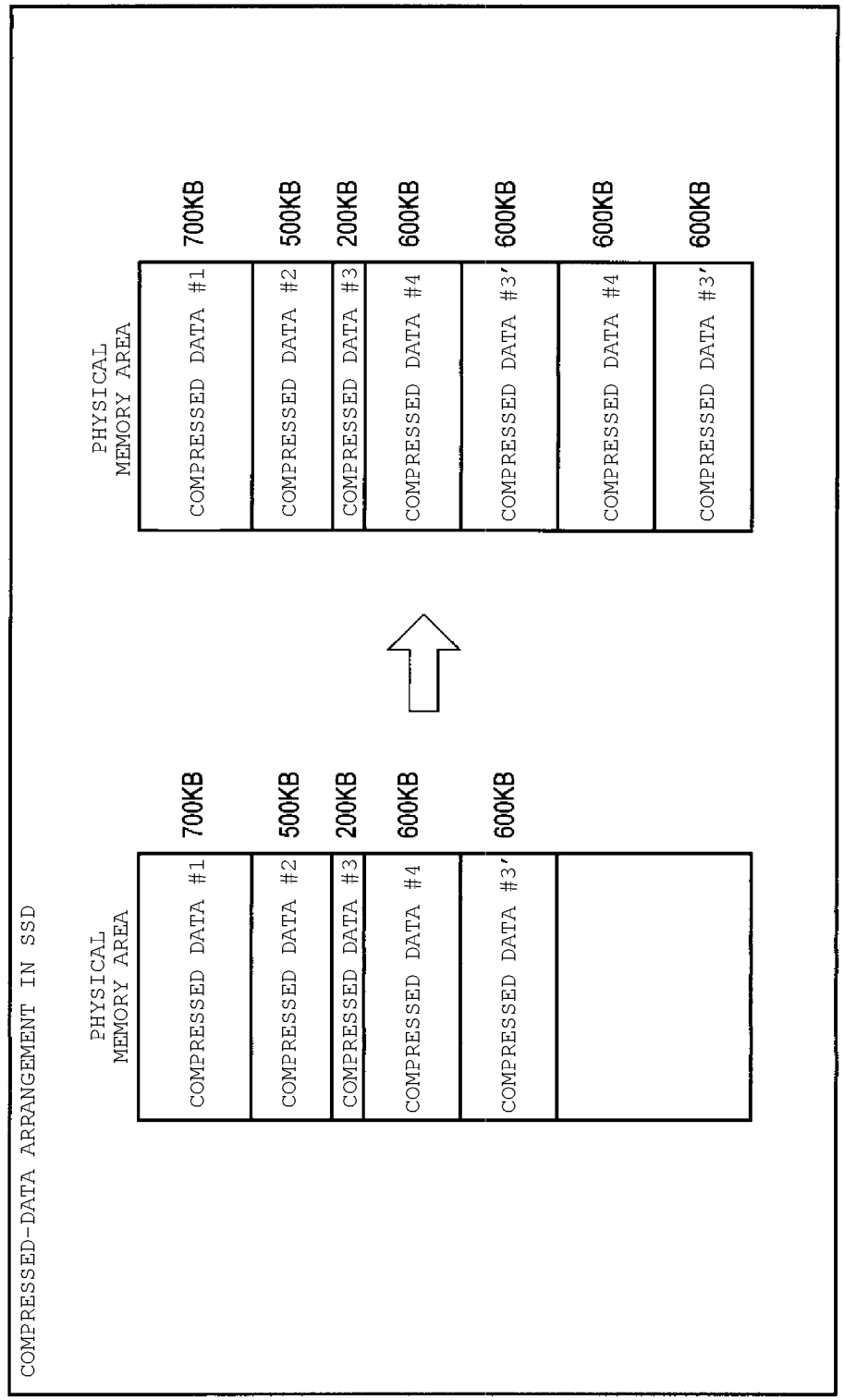
FIG. 3 illustrates a compressed-data arrangement in an SSD of the storage system.

FIG. 3 illustrates a data arrangement (compressed data arrangement) in the SSD applied to the system configuration shown in FIG. 2.

Figure 4:
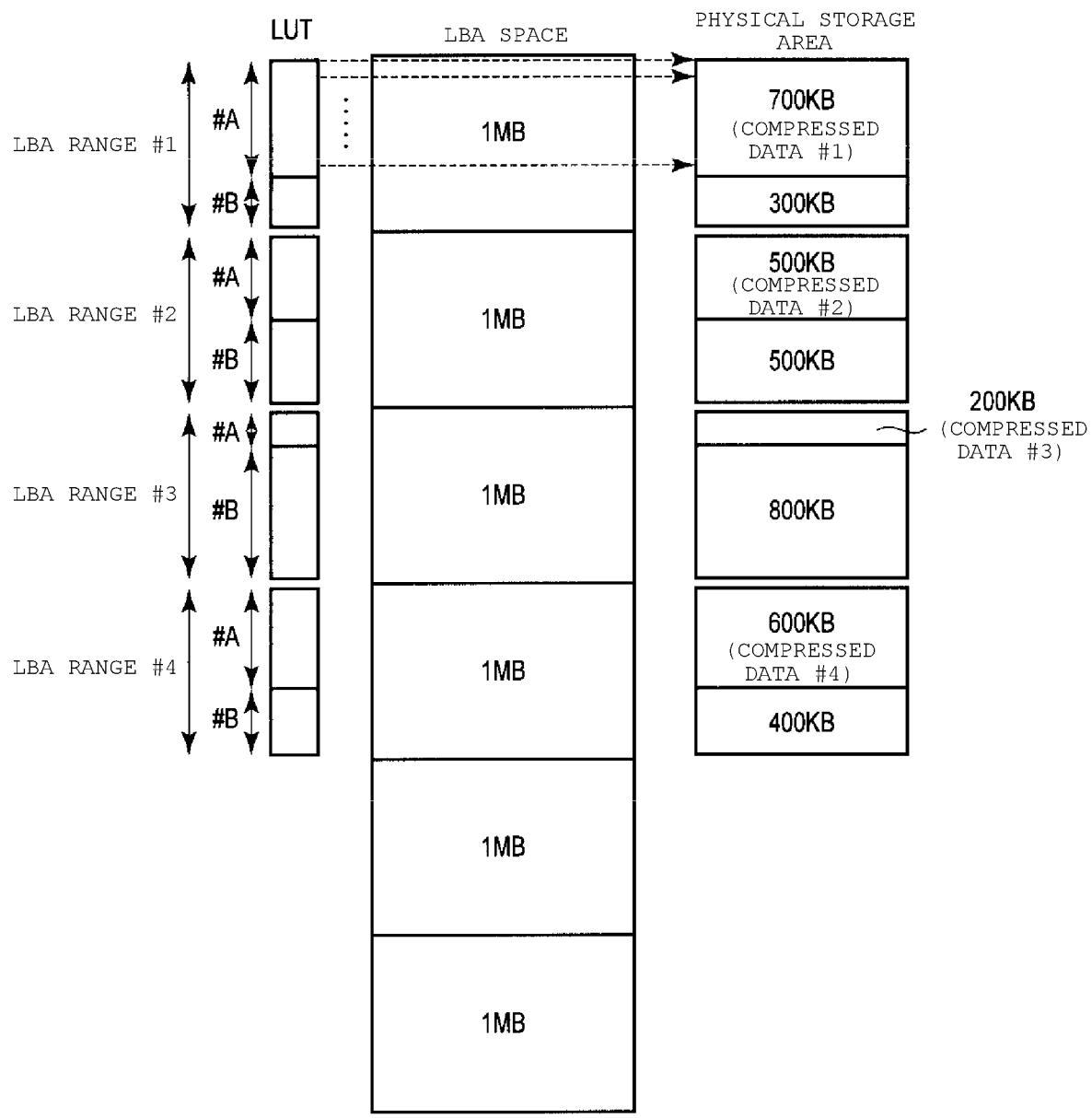
FIG. 4 illustrates compressed-data management executed by a storage system according to the embodiment.

The left part of FIG. 3 illustrates a data arrangement on the physical storage area in the SSD after the compressed data #1, the compressed data #2, the compressed data #3, the compressed data #4, and the compressed data #3' are written, and the right part of FIG. 4 illustrates a data arrangement on the physical storage area in the SSD after the movement of the compressed data #4 and the compressed data #3'. As can be understood from FIG. 3, after the writing of the compressed data #3' is performed, the writing of the compressed data #4 (the second time of writing the compressed data #4) is performed, and thereafter, the writing of the compressed data #3' (the second time of writing of the compressed data #3') is performed in the SSD.

In this way, even though the host only intends to rewrite the compressed data #3 to the compressed data #3', the writing of a large amount of data such as the second time of writing of the compressed data #4 and the second time of writing of the compressed data #3' is performed in the SSD.

FIG. 4 illustrates the compressed-data management executed by the SSD 3 according to the present embodiment.

The controller 4 of the SSD 3 receives write data of a data length equal to a minimum data length (for example, 1 MB) or more from the host 2, compresses the write data, and writes the compressed data to the NAND flash memory 5.

When the compressed data #1 of 700 KB are obtained by compressing the data #1 of 1 MB, the controller 4 writes the compressed data #1 of 700 KB to the NAND flash memory 5. The controller 4 logically divides the LBA range #1 correlated with the uncompressed data #1 into the LBA range # A and the LBA range # B such that the host 2 is able to address the data #1, using the LBA range #1 of 1 MB for the uncompressed data #1, regardless of the data length of the compressed data #1.

The LBA range #1 is defined by a pair of the start LBA and the data length (here, for example, 1 MB) which are respectively contained in the write command for the data #1. The LBA range # A is a logical address range that starts at the start LBA contained in the write command and is correlated with the data length (here, for example, 700 KB) of the compressed data #1. The LBA range # B is a remaining logical address range in the LBA range #1 of 1 MB correlated with the uncompressed data #1. The LBA range # B has a range that starts at the next LBA of the last LBA of the LBA range # A and is correlated with a difference (here, 300 KB) between the data length of the data #1 and the data length of the compressed data #1.

The controller 4 updates the LUT 32, maps each physical address in the physical storage area to which the compressed data #1 are written, to each LBA in a LBA range # A, and sets each LBA in a LBA range # B to a state where no physical addresses are mapped (unmapped state (deallocated state)). Each LBA in the LBA range # B may become the state (unmapped state) as the state after unmap/trim process is performed on the LBA range B.

In this case, the controller 4 may set each entry in the LUT 32 correlated with the LBA range # B to a free state, or may set these entries to a certain value indicating the unmapped state (deallocated state), by updating each entry in the LUT 32 correlated with the LBA range # B. Thus, it is possible to set each LBA in the LBA range # B to the unmapped state. If each entry in the LUT 32 correlated with the LBA range # B is already set to a free state, the controller 4 dose not register any physical address at each entry in the LUT 32 correlated with the LBA range # B. Thus, it is possible to set each LBA in the LBA range # B to the unmapped state.

As a result, the host 2 is able to easily address the compressed data #1, using the same set of the start LBA and the data length as the set of the start LBA and the data length which is contained in the write command for the data #1, regardless of the data length of the compressed data #1.

When the compressed data #2 of 500 KB is obtained by compressing the data #2 of 1 MB, the controller 4 writes the compressed data #2 of 500 KB to the NAND flash memory 5. The controller 4 logically divides the LBA range #2 correlated with the uncompressed data #2 into the LBA range # A and the LBA range # B such that the host 2 is able to address the data #2, using the LBA range #2 of 1 MB for the uncompressed data #2, regardless of the data length of the compressed data #2.

The LBA range #2 correlated with the uncompressed data #2 is defined by a pair of the start LBA and the data length (here, for example, 1 MB) which are respectively contained in the write command for the data #2. The LBA range #2 is, for example, the LBA range of 1 MB subsequent to the LBA range #1. The LBA range # A is a logical address range that starts at the start LBA of the LBA range #2 and is correlated with the data length (here, for example, 500 KB) of the compressed data #2. The LBA range # B is a remaining logical address range in the LBA range #2 of 1 MB correlated with the uncompressed data #2. The LBA range # B has a range that starts at the next LBA of the last LBA of the LBA range # A and is correlated with a difference (here, 500 KB) between the data length of the data #2 and the data length of the compressed data #2.

The controller 4 updates the LUT 32, maps each physical address in the physical storage area to which the compressed data #2 is written, to each LBA in a LBA range # A contained in the LBA range #2, and sets each LBA in a LBA range # B contained in the LBA range #2 to a state where the physical addresses are not mapped (unmapped state).

When the compressed data #3 of 200 KB is obtained by compressing the data #3 of 1 MB, the controller 4 writes the compressed data #3 of 200 KB into the NAND flash memory 5. The controller 4 logically divides the LBA range #3 correlated with the uncompressed data #3 into the LBA range # A and the LBA range # B such that the host 2 is able to address the data #3, using the LBA range #3 of 1 MB for the uncompressed data #3, regardless of the data length of the compressed data #3.

The LBA range #3 correlated with the uncompressed data #3 is defined by a pair of the start LBA and the data length (here, for example, 1 MB) which are respectively contained in the write command for the data #3. The LBA range #3 is, for example, the LBA range of 1 MB subsequent to the LBA range #2. The LBA range # A is a logical address range that starts at the start LBA of the LBA range #3 and is correlated with the data length (here, for example, 200 KB) of the compressed data #3. The LBA range # B is a remaining logical address range in the LBA range #3 of 1 MB correlated with the uncompressed data #3. The LBA range # B has a range that starts at the next LBA of the last LBA of the LBA range # A and is correlated with a difference (here, 800 KB) between the data length of the data #3 and the data length of the compressed data #3.

The controller 4 updates the LUT 32, maps each physical address in the physical storage area to which the compressed data #3 are written, to each LBA in a LBA range # A contained in the LBA range #3, and sets each LBA in a LBA range # B contained in the LBA range #3 to a state where no physical addresses are mapped (unmapped state).

When the compressed data #4 of 600 KB are obtained by compressing the data #4 of 1 MB, the controller 4 writes the compressed data #4 of 600 KB to the NAND flash memory 5. The controller 4 logically divides the LBA range #4 correlated with the uncompressed data #4 into the LBA range # A and the LBA range # B such that the host 2 is able to address the data #4, using the LBA range #4 of 1 MB for the uncompressed data #4, regardless of the data length of the compressed data #4.

The LBA range #4 correlated with the uncompressed data #4 is defined by a pair of the start LBA and the data length (here, for example, 1 MB) which are respectively contained in the write command for the data #4. The LBA range #4 is, for example, the LBA range of 1 MB subsequent to the LBA range #3. The LBA range # A is the logical address range that starts at the start LBA of the LBA range #4 and is correlated with the data length (here, for example, 600 KB) of the compressed data #4. The LBA range # B is a remaining logical address range in the LBA range #4 of 1 MB correlated with the uncompressed data #4. The LBA range # B has a range that starts at the next LBA of the last LBA of the LBA range # A and is correlated with a difference (here, 400 KB) between the data length of the data #4 and the data length of the compressed data #4.

The controller 4 updates the LUT 32, maps each physical address in the physical storage area to which the compressed data #4 are written, to each LBA in a LBA range # A contained in the LBA range #4, and sets each LBA in a LBA range # B contained in the LBA range #4 to a state where no physical addresses are mapped (unmapped state).

Figure 5:
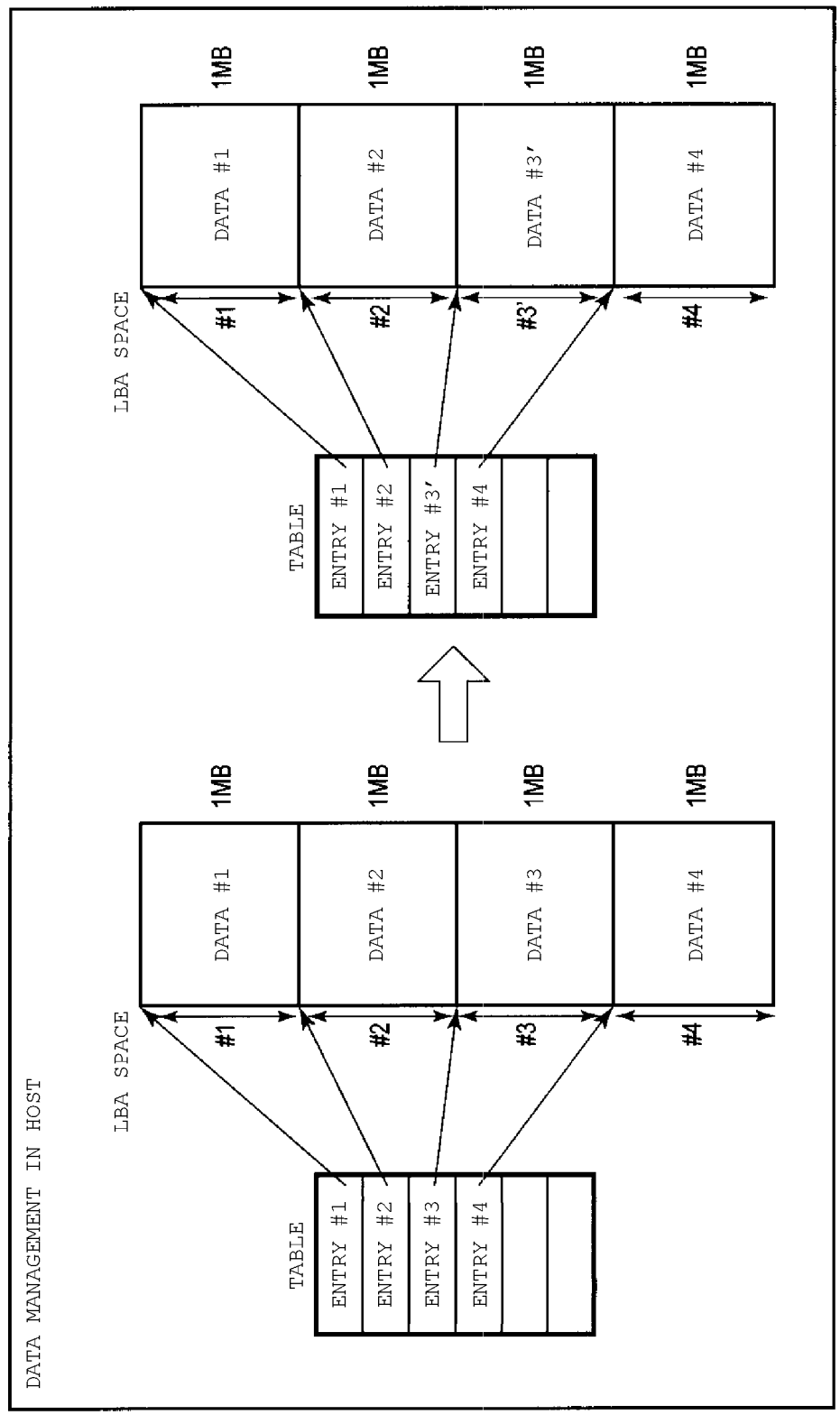
FIG. 5 illustrates data management executed by the host in cooperation with the storage system which executes the compressed-data management shown in FIG. 4.

FIG. 5 illustrates data management executed by the host 2 which is configured to work in cooperation with the SSD 3 that executes the compressed data management shown in FIG. 4.

When it is necessary to write the data #1 of 1 MB to the SSD 3, the host 2 associates the data #1 with a LBA range #1 of 1 MB, registers the start LBA of the LBA range #1 at the entry #1 of a table, and sends a request for writing the data #1 to the SSD 3. In this case, the write command sent by the host 2 includes the start LBA of the LBA range #1 and the data length of 1 MB.

When it is necessary to write the data #2 of 1 MB to the SSD 3, the host 2 associates the data #2 with a LBA range #2 of the next 1 MB which is subsequent to the LBA range #1 for the data #1, registers the start LBA of the LBA range #2 at the entry #2 of a table, and sends a request for writing the data #2 to the SSD 3. In this case, the write command sent by the host 2 includes the start LBA of the LBA range #2 and the data length of 1 MB.

When it is necessary to write the data #3 of the next 1 MB to the SSD 3, the host 2 associates the data #3 with a LBA range #3 of the next 1 MB which is subsequent to the LBA range #2 for the data #2, registers the start LBA of the LBA range #3 at the entry #3 of a table, and sends a request for writing the data #3 to the SSD 3. In this case, the write command sent by the host 2 includes the start LBA of the LBA range #3 and the data length of 1 MB.

When it is necessary to write the data #4 of the next 1 MB to the SSD 3, the host 2 associates the data #4 with a LBA range #4 of the next 1 MB which is subsequent to the LBA range #3 for the data #3, registers the start LBA of the LBA range #4 at the entry #4 of a table, and sends a request for writing the data #4 to the SSD 3. In this case, the write command sent by the host 2 includes the start LBA of the LBA range #4 and the data length of 1 MB.

Thereafter, the host 2 may update, for example, the data #3. When it is necessary to write the updated data #3' of 1 MB to the SSD 3, the host 2 associates the data #3' with the LBA range #3 for the data #3, registers the start LBA of the LBA range #3 as the start LBA of the data #3' at the entry #3 of a table, and sends a request for writing the data #3' to the SSD 3. In this case, the write command sent by the host 2 includes the start LBA of the LBA range #3 and the data length of 1 MB.

In this way, since the data #3' can be associated with the LBA range #3 for the data #3, it is not necessary for the host 2 to perform a process of associating the data #3' with a new LBA range and a process of disabling the data in the LBA range #3. Furthermore, since the fragmentation also does not occur, it is not necessary to perform a process of moving the data #4 and the data #3'.

Figure 6:
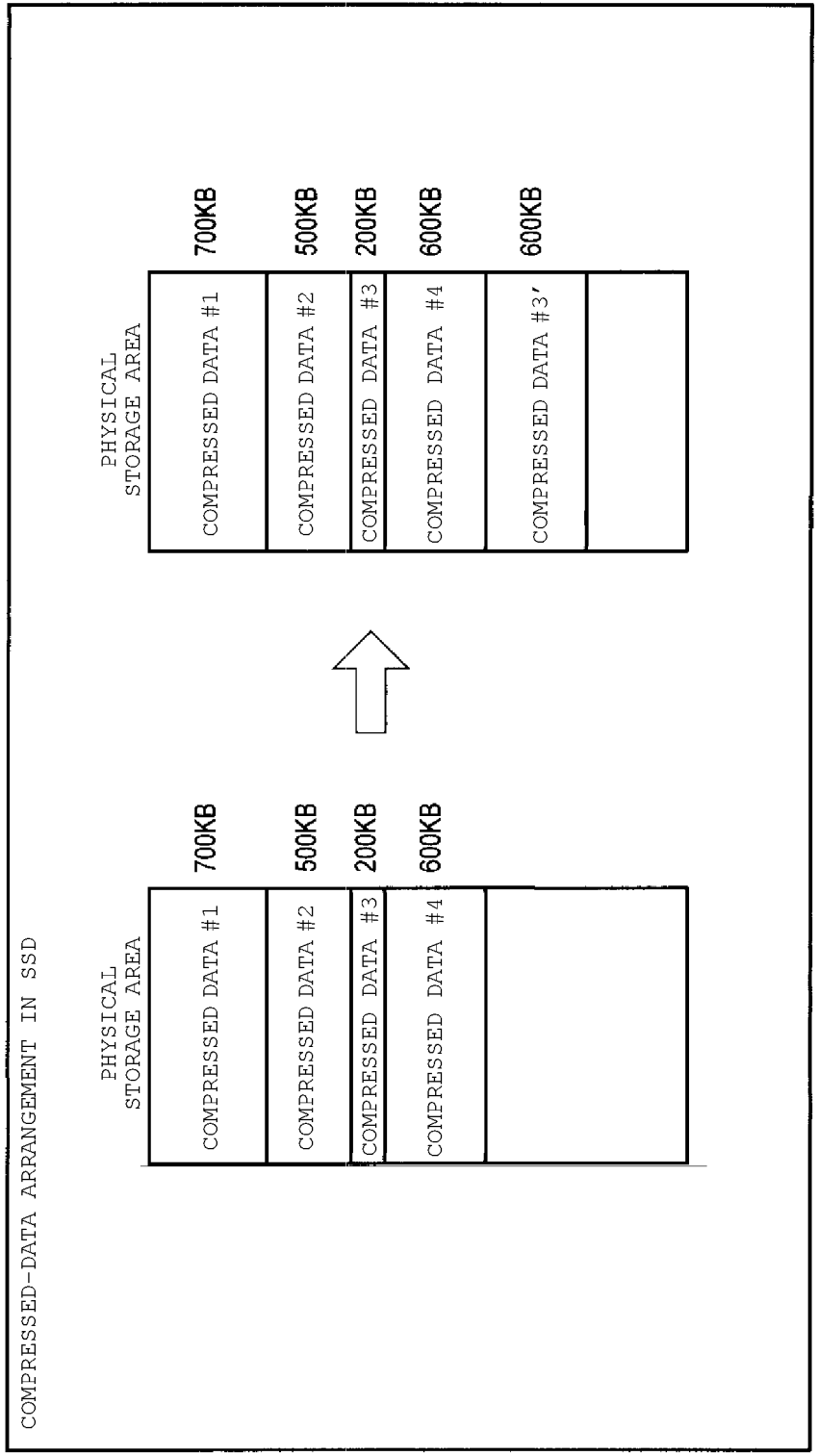
FIG. 6 illustrates a compressed-data arrangement in a storage system according to the embodiment.

FIG. 6 illustrates data arrangement (compressed data arrangement) in the SSD 3.

The left part of FIG. 6 illustrates the data arrangement on the physical storage area in the SSD 3 after the data #1, the data #2, the data #3, and the data #4 are written.

The data #1 of 1 MB are compressed by the controller 4 of the SSD 3. When the compressed data #1 of 700 KB are generated by compression of the data #1, the controller 4 writes the compressed data #1 of 700 KB to the memory area of 700 KB in the NAND flash memory 5, maps each physical address of the memory area to which the compressed data #1 are written only to each LBA of the first 700 KB in the LBA range #1, and sets each LBA of the remaining 300 KB in the LBA range #1 to an unmapped state.

The data #2 of the next 1 MB are compressed by the controller 4 of the SSD 3. When the compressed data #2 of 500 KB are generated by compression of the data #2, the controller 4 writes the compressed data #2 of 500 KB to the memory area of the next 500 KB in the NAND flash memory 5, maps each physical address of the memory area to which the compressed data #2 are written only to each LBA of the first 500 KB in the LBA range #2, and sets each LBA of the remaining 500 KB in the LBA range #2 to an unmapped state.

The data #3 of the next 1 MB are compressed by the controller 4 of the SSD 3. When the compressed data #3 of 200 KB are generated by compression of the data #3, the controller 4 writes the compressed data #3 of 200 KB to the memory area of the next 200 KB in the NAND flash memory 5, maps each physical address of the memory area to which the compressed data #3 are written only to each LBA of the first 200 KB in the LBA range #3, and sets each LBA of the remaining 800 KB in the LBA range #3 to an unmapped state.

The data #4 of the next 1 MB are compressed by the controller 4 of the SSD 3. When the compressed data #4 of 600 KB are generated by compression of the data #4, the controller 4 writes the compressed data #4 of 600 KB to the memory area of the next 600 KB in the NAND flash memory 5, maps each physical address of the memory area to which the compressed data #4 are written only to each LBA of the first 600 KB in the LBA range #4, and sets each LBA of the remaining 400 KB in the LBA range #4 to an unmapped state.

The right part of FIG. 6 illustrates the data arrangement on the physical storage area in the SSD 3 after the data #3' are written.

The data #3' of 1 MB are compressed by the controller 4 of the SSD 3. When the compressed data #3' of 600 KB are generated by compression of the data #3', the controller 4 writes the compressed data #3' of 600 KB to the memory area of 600 KB in the NAND flash memory 5, maps each physical address of the memory area to which the compressed data #3' are written, only to each LBA of first 600 KB in the LBA range #3, and sets each LBA of the remaining 400 KB in the LBA range #3 to an unmapped state.

Next, an outline of the specification of a write operation and a read operation which are executed by the SSD 3 will be described.

(1) Write Operation (Compression Write Operation)

The host 2 sends a write command designating a pair of the start LBA and the data length to the SSD 3.

The controller 4 of the SSD 3 does not allow the rewriting from an intermediate address in an area in which recording of the compressed data is completed. In other words, when the existing data of the start LBA of the write command are compressed data and the start LBA of the write command does not match the start LBA at the previous record, the controller 4 of the SSD 3 returns a response indicating an error to the host 2. Now, for example, it is assumed that data correlated with any LBA range of 1 MB are compressed by the SSD 3, and the compressed data are recorded in the SSD 3. If the range starting from an intermediate address in the LBA range is designated as a write target LBA range by a subsequent write command received from the host 2, the controller 4 of the SSD 3 does not allow execution of the write command, and returns a response indicating an error to the host 2. Meanwhile, if the range starting from the start LBA of the LBA range is designated as the write target LBA range by the subsequent write command received from the host 2, the controller 4 of the SSD 3 allows execution of the write command, and performs the write operation (compression write operation) for compressing and writing data.

The minimum data length of data to be compressed is larger than the management size. The minimum data length is, for example, 1 MB, and the host 2 is able to select arbitrary length of an integer multiple.

The length of data is selectable at each time of writing, but the maximum length of writable data is restricted by the compression engine 23.

The controller 4 of the SSD 3 supports a plurality of types of compression methods. The host 2 is able to designate a compression method to be used, as necessary. The write command may contain a parameter for designating one of a plurality of types of compression methods. The controller 4 of the SSD 3 compresses the write data using the compression method that is designated by this parameter. If the host 2 does not designate a compression method, the controller 4 of the SSD 3 compresses the write data by using a default compression method.

Further, the SSD 3 also supports the non-compression mode. In this case, the write command includes a parameter designating compression or non-compression. If the non-compression is designated by the parameter, the controller 4 writes the write data to the memory area within the NAND flash memory 5, without compressing the write data.

Further, the controller 4 of the SSD 3 can cause the SSD 3 to function as a drive (storage device) allowing uncompressed data and compressed data to coexist.

The host 2 is able to select compression or non-compression for each namespace. The controller 4 associates either a compression mode or a non-compression mode for each of the plurality of namespaces, based on a request from the host 2 that designates compression or non-compression for each namespace. When the compression mode is associated with the namespace correlated with the namespace ID contained in the write command, the controller 4 compresses the write data. When the non-compression mode is associated with the namespace correlated with the namespace ID contained in the write command, the controller 4 does not compress the write data.

Uncompressed data and compressed data may coexist in the same namespace. In this case, the write command may include a namespace ID and a parameter designating compression or non-compression.

(2) Read Operation

The host 2 may send a read command designating the same set of the start LBA and the data length as the set of the start LBA and the data length which is designated at the time of writing, to the SSD 3.

The controller 4 of the SSD 3 does not support reading of partial data in intermediate addresses in an area in which the recording of the compressed data is completed.

The controller 4 of the SSD 3 does not support reading of partial data starting from the start of an area in which the recording of the compressed data is completed.

Now, for example, it is assumed that data correlated with any LBA range of 1 MB are compressed by the SSD 3, and the compressed data are recorded in the SSD 3. If the range starting from an intermediate address in the LBA range is designated as the LBA range fora read target by the read command received from the host 2, the controller 4 of the SSD 3 does not allow execution of the read command, and returns a response indicating an error to the host 2. Meanwhile, if the range starting from the start LBA of the LBA range is designated as the LBA range for a read target by the read command received from the host 2, the controller 4 of the SSD 3 allows execution of the read command.

Figure 7:
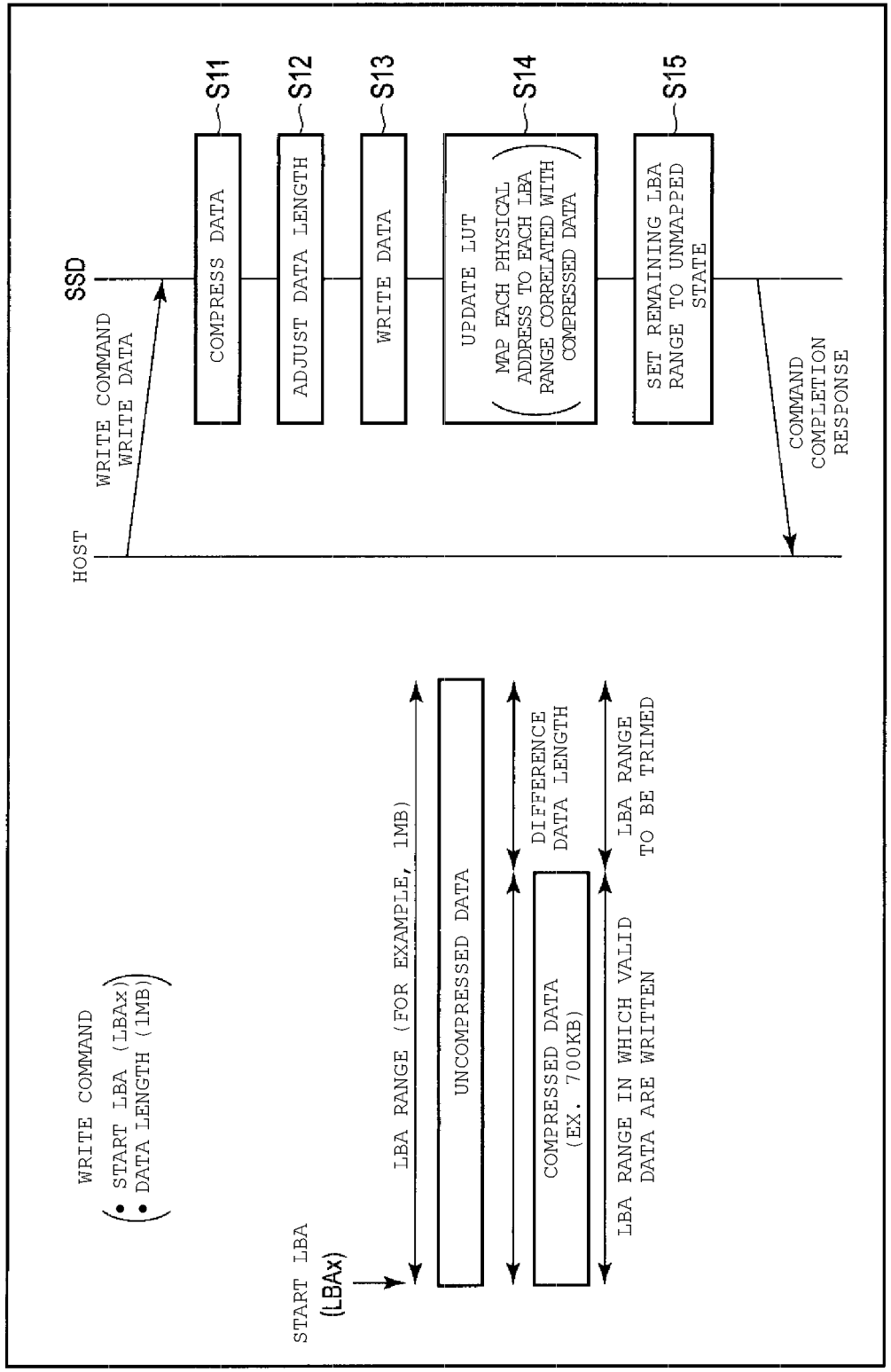
FIG. 7 illustrates a data write operation executed by the storage system according to the embodiment.

FIG. 7 illustrates a write operation (compression write operation) executed by the SSD 3.

The controller 4 of the SSD 3 receives write data of a data length (for example, 1 MB) equal to a minimum data length or more from the host 2, in response to reception of the write command from the host 2. The write command includes the start LBA (LBAx) and the data length (for example, 1 MB).

The controller 4 compresses the write data received from the host 2, and determines the data length of the compressed data (step S11). The controller 4 may adjust the data length of the compressed data by rounding off the data length of the compressed data to units of 4 KB (management size units) (step S12). The controller 4 writes the compressed data to the physical storage position of the NAND flash memory 5, that is, each of the available pages of the current write destination block, similarly to a normal data write operation (step S13). The controller 4 updates the LUT 32, and maps the physical address of each physical storage position in which the compressed data (valid data) are written, to each LBA in the LBA range in which the compressed data (valid data) are written (step S14). The LBA range in which the compressed data (valid data) are written starts at start LBA (LBAx) and has a range correlated with the data length of the compressed data. For example, if the data length of the compressed data is 700 KB, the physical address is mapped only to the LBA range of 700 KB which starts at the start LBA (LBAx), and is associated with the physical address correlated with each LBA in the LBA range. The controller 4 sets the LBA range of the remaining 300 KB to an unmapped state where the physical addresses are not mapped (step S15). If each entry in the LUT 32 correlated with the remaining LBA range of 300 KB is already set to a free state, or a value indicating the unmapped state is set in each entry, the controller 4 may register the physical address at the entry. In step S15, the controller 4 performs a trim process on the LBA range of the remaining 300 KB which is subsequent to the LBA range, as necessary. Thus, even if the physical address of old data is associated with the LBA range of, for example, the remaining 300 KB, it is possible to set the LBA range of the remaining 300 KB to an unmapped state.

As a result, the controller 4 is able to handle a difference area (here, the LBA range of the remaining 300 KB) between the data length of the write data and the data length of the compressed data as an LBA range which is trimmed and unmapped. Even if the data length of data correlated with the LBA range of 1 MB which starts at the start LBA (LBAx) is changed to a certain data length, the host 2 is able to execute reading and writing (rewriting) of the data, by using the LBA range of 1 MB. Therefore, since the garbage collection on the host 2 side as illustrated in FIG. 2 is not required, the data amount to be written to the SSD 3 is also reduced.

Figure 8:
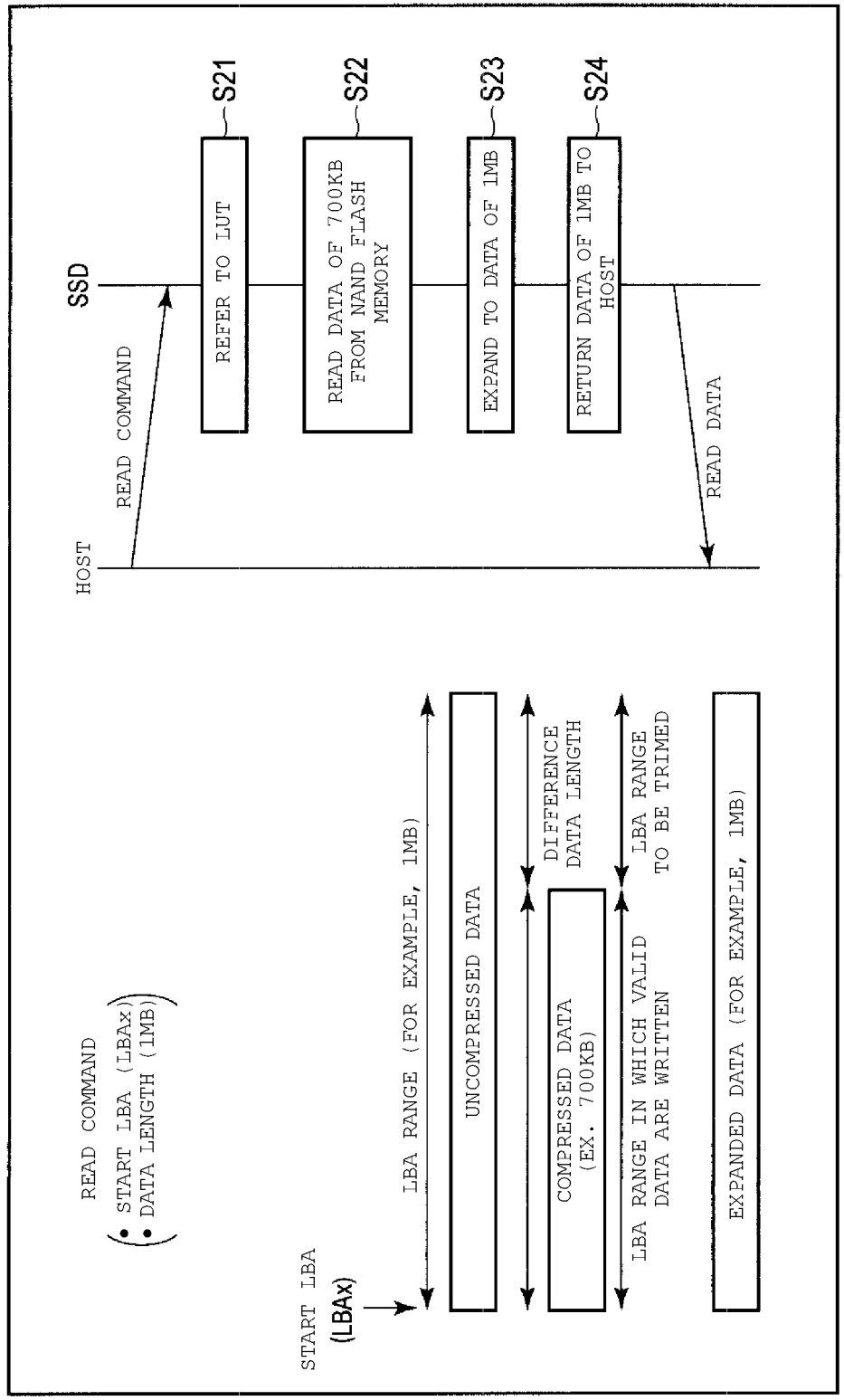
FIG. 8 illustrates a data read operation executed by the storage system according to the embodiment.

FIG. 8 illustrates the data read operation executed by the SSD 3.

When it becomes necessary for the host 2 to read the data which was written in FIG. 7, the host 2 sends a read command containing the start LBA (LBAx) and the data length (1 MB) to the SSD 3.

The controller 4 of the SSD 3 specifies each physical address mapped to the LBA range of 1 MB which starts at the start LBA (LBAx), with reference to the LUT 32, in response to reception of the read command (step S21). In the present embodiment, physical addresses are allocated only to the range of the first 700 KB in the LBA range, and physical addresses are not allocated to the range of the remaining 300 KB. That is, the controller 4 reads the compressed data of 700 KB from the NAND flash memory 5, based on the physical address of each LBA in the range of the first 700 KB (step S22). The controller 4 obtains data of 1 MB by expanding the read compressed data (step S23). The controller 4 returns the data of 1 MB obtained by the expansion to the host 2 (step S24).

If the host 2 sends a read command containing the start LBA (LBAx) and the data length (for example, 256 KB) to the SSD 3, the controller 4 returns only data of the first 256 KB obtained by the expansion to the host 2.

Figures 9, 10:
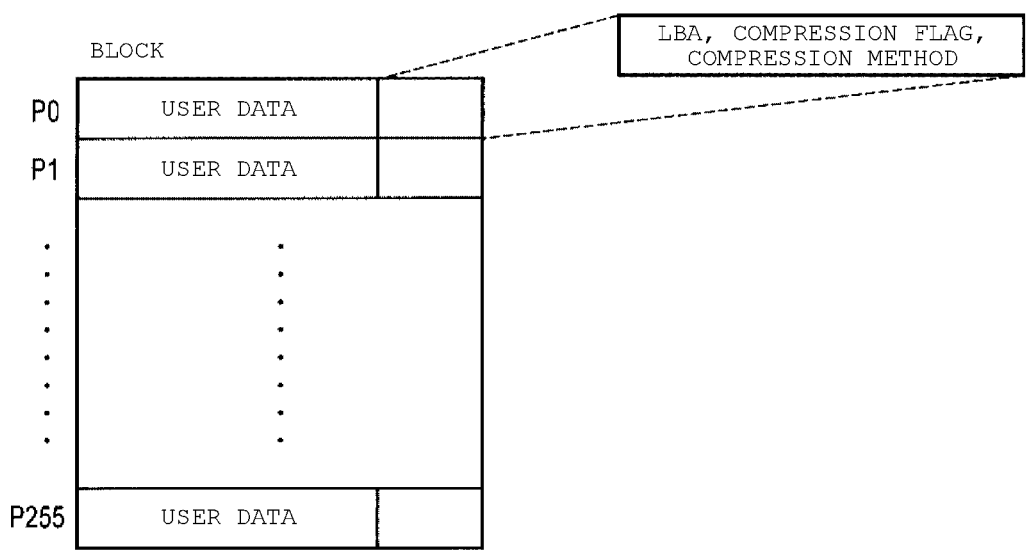
FIG. 9 illustrates an example of management information stored in the storage system according to the embodiment.
FIG. 10 illustrates an example of management information written to each page of a nonvolatile memory in the storage system according to the embodiment.

FIG. 9 illustrates the management information stored in the NAND flash memory 5 of the SSD 3.

The management information contains a plurality of memory areas which are correlated with the respective received write commands. Each memory area may contain a "start LBA" field, an "uncompressed data length" field, a "compressed data length" field, a "compressionmethod" field, and a "compression flag" field. The "start LBA" field indicates a start LBA designated by the correlated write command. The "uncompressed data length" field indicates a data length of uncompressed data (i.e., write data received from the host), that is, a data length designated by the correlated write command. The "compressed data length" field indicates a data length of the compressed data. The "compression method" field indicates a compression method used for data compression. The "compression flag" field indicates whether the written data are compressed data or uncompressed data.

The controller 4 of the SSD 3 is able to execute the data read operation and the garbage collection operation more accurately, based on the management information.

FIG. 10 illustrates an example of management information that is written to each page of each block of the NAND flash memory 5.

The management information about user data maybe written to each page, in addition to the user data. The LBA of the user data, the compression flag indicating whether the user data are compressed data or uncompressed data, and the compression method information indicating the compression method that is applied to the user data may be contained in the management information. Further, the management information about the user data may contain information indicating whether or not the LBA of the user data is the start LBA.

FIG. 11 illustrates a write command applied to the SSD 3. The write command includes the following parameters.

(1) Start LBA
(2) Data length (the number of logical blocks)
(3) Compression mode The start LBA indicates a start LBA of data to be written.

The data length indicates a length of the data to be written (the number of logical blocks correlated with the data to be written). A minimum data length is a data length larger than the management size. The host 2 is able to designate the length of an integer multiple of the minimum data length.

In the compression mode, one of four modes correlated with "00", "01", "10", and "11" can be designated. "00" designates use of a default compression method. "01" designates use of a compression method #1. "10" designates use of a compression method #2 different from the compression method #1. "11" designates writing of data without compression.

FIG. 12 illustrates an extension namespace management command applied to the SSD 3.

The extension namespace management command is used for namespace management including creation and deletion of a namespace, and association between a namespace and a compression mode. The extension namespace management command includes the following parameters.

(1) Create/Delete
(2) LBA range (the number of logical blocks)
(3) Physical resource size
(4) Compression mode Create/Delete parameter "0" is used to request creation of namespace to the SSD 3. Create/Delete parameter "1" is used to request deletion of namespace to the SSD 3. When requesting deletion of a namespace, a parameter indicating the ID of the namespace to be deleted may be set in the extension namespace management command. When requesting deletion of a namespace, the LBA range (the number of logical blocks), the physical resource size, and the compression mode may be ignored.

The LBA range indicates a namespace LBA range (LBA0 to n-1). The LBA range is mapped to the user area of the namespace.

The physical resource size indicates the number of physical blocks to be reserved for the namespace.

In the compression mode, a compression mode to be associated with the namespace can be set. The compression mode designates one of four modes correlated with "00", "01", "10", and "11". "00" designates use of a default compression method. "01" designates use of a compression method #1. "10" designates use of a compression method #2 different from the compression method #1. "11" designates writing of data without compression.

FIG. 13 illustrates a read command applied to the SSD 3. The read command includes the following parameters.

(1) Start LBA
(2) Data length (the number of logical blocks)

The start LBA indicates a start LBA of data to be read.

The data length indicates a length of the data to be read (the number of logical blocks correlated with the data to be read). Typically, a minimum data length is a data length larger than the management size. The host 2 is able to designate the length of an integer multiple of the minimum data length. Typically, the pair of the start LBA and the data length is the same as the pair of the LBA and the data length at the time of writing.

Figure 14:
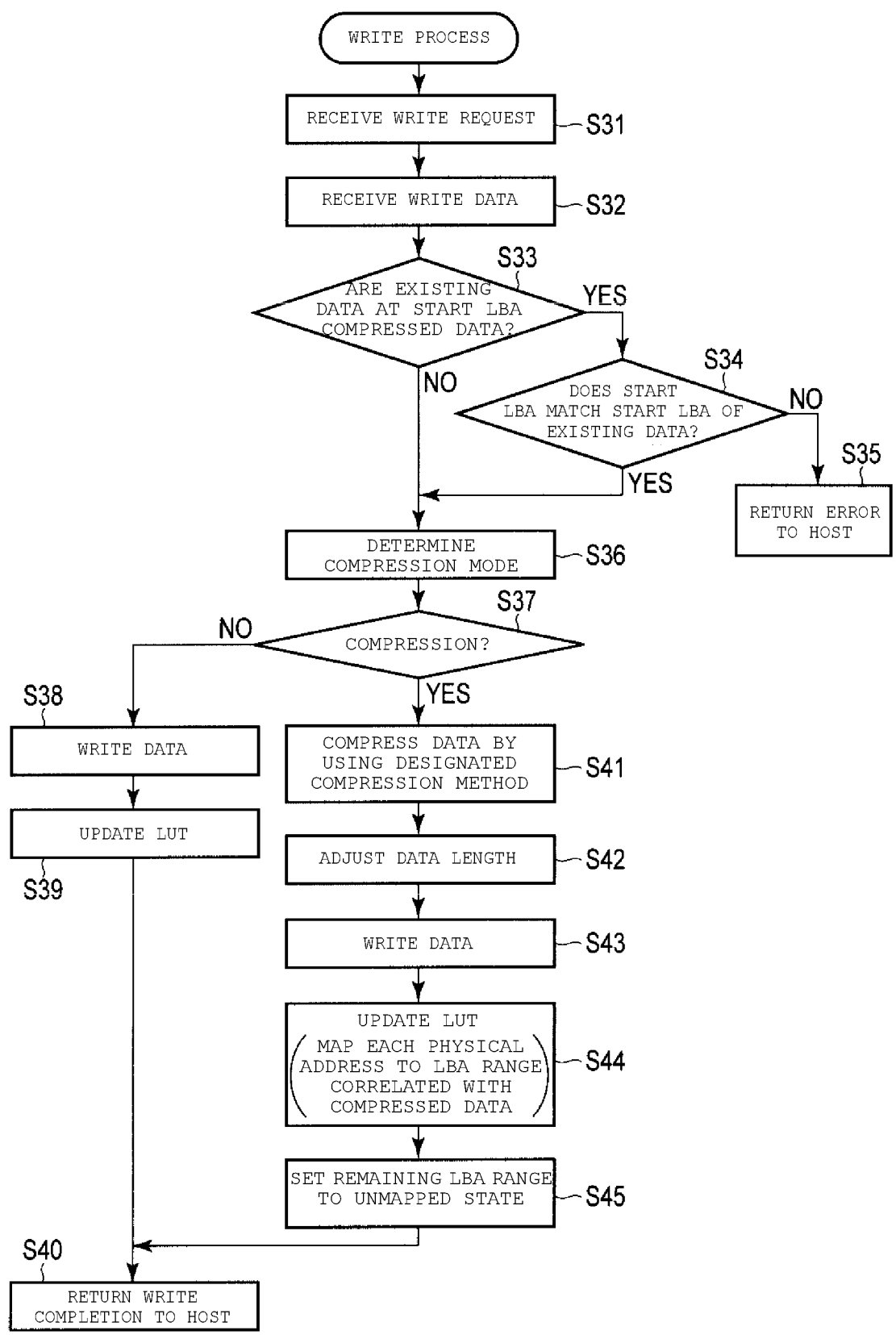
FIG. 14 is a flowchart illustrating a procedure of a write process executed by the storage system according to the embodiment.

FIG. 14 illustrates procedures of the write process executed by the SSD 3.

The controller 4 of the SSD 3 receives a write request (write command) and data to be written (write data) from the host 2 (step S31 and S32). The controller 4 determines whether or not the existing data of the start LBA of the write command is compressed data (step S33). If the existing data of the start LBA of the write command is compressed data (YES in step S33), the controller 4 determines whether or not the start LBA of the write command matches the start LBA of the existing data (compressed data) (step S34). If the start LBA of the write command does not match the start LBA of the existing data (compressed data) (NO in step S34), the controller 4 recognizes that a write target LBA range designated by a pair of the start LBA and the data length which are contained in the write command as the LBA range starting from an intermediate LBA in the LBA range of the existing data (compressed data), and returns a response indicating an error to the host 2, without executing the write command (step S35).

If the existing data of the start LBA of the write command is not the compressed data (NO in step S33), or if the existing data of the start LBA of the write command is the compressed data and the start LBA of the write command matches the start LBA of the existing data (compressed data) (YES in step S34), the controller 4 executes the write command.

In this case, first, the controller 4 determines the parameters of the compression mode in the write command (step S36), and determines which one of the compression mode and the non-compression mode is designated (step S37).

If the non-compression mode is designated (NO in step S37), the controller 4 writes the write data to the physical storage position of the NAND flash memory 5, that is, each of the available pages in the current write destination block (step S38), updates the LUT 32, maps each physical address of the physical storage position to each LBA in the LBA range of the write data (step S39), and returns a response indicating the write completion to the host 2 (step S40).

If the compression mode is designated (YES in step S37), the controller 4 compresses the write data, using the designated compression method (a default compression method or a compression method) which is explicitly designated in the write command, and determines the data length of the compressed data (step S41). The controller 4 may adjust the data length of the compressed data by rounding off the data length of the compressed data to units of 4 KB (management size units) (step S42). The controller 4 writes the compressed data to the physical storage position of the NAND flash memory 5, that is, each of the available pages of the current write destination block (step S43). The controller 4 updates the LUT 32, and maps the physical address of each physical storage position to which the compressed data (valid data) were written, to each LBA in the LBA range in which the compressed data (valid data) were written (step S44). The LBA range in which the compressed data were written starts at the start LBA in the write command, and has a range correlated with the data length of the compressed data. The controller 4 sets each LBA in a remaining LBA range correlated with the difference between the data length of the write data and the data length of the compressed data, to an unmapped state where no physical addresses are mapped (step S45). Thereafter, the controller 4 returns a response indicating the write completion to the host 2 (step S40). This response may include a parameter indicating the data length of the compressed data, in order to notify the host 2 of the compressed data length.

FIG. 15 illustrates a write command for a namespace applied to the SSD 3.

The write command for a namespace includes the following parameters.

(1) Start LBA
(2) Data length (the number of logical blocks)
(3) NSID

The start LBA indicates a start LBA of data to be written.

The data length indicates a length of the data to be written (the number of logical blocks correlated with the data to be written). A minimum data length is a data length larger than the management size. The host 2 is able to designate the length of an integer multiple of the minimum data length.

The NSID indicates an identifier (ID) of a namespace to which data are to be written.

Figure 16:
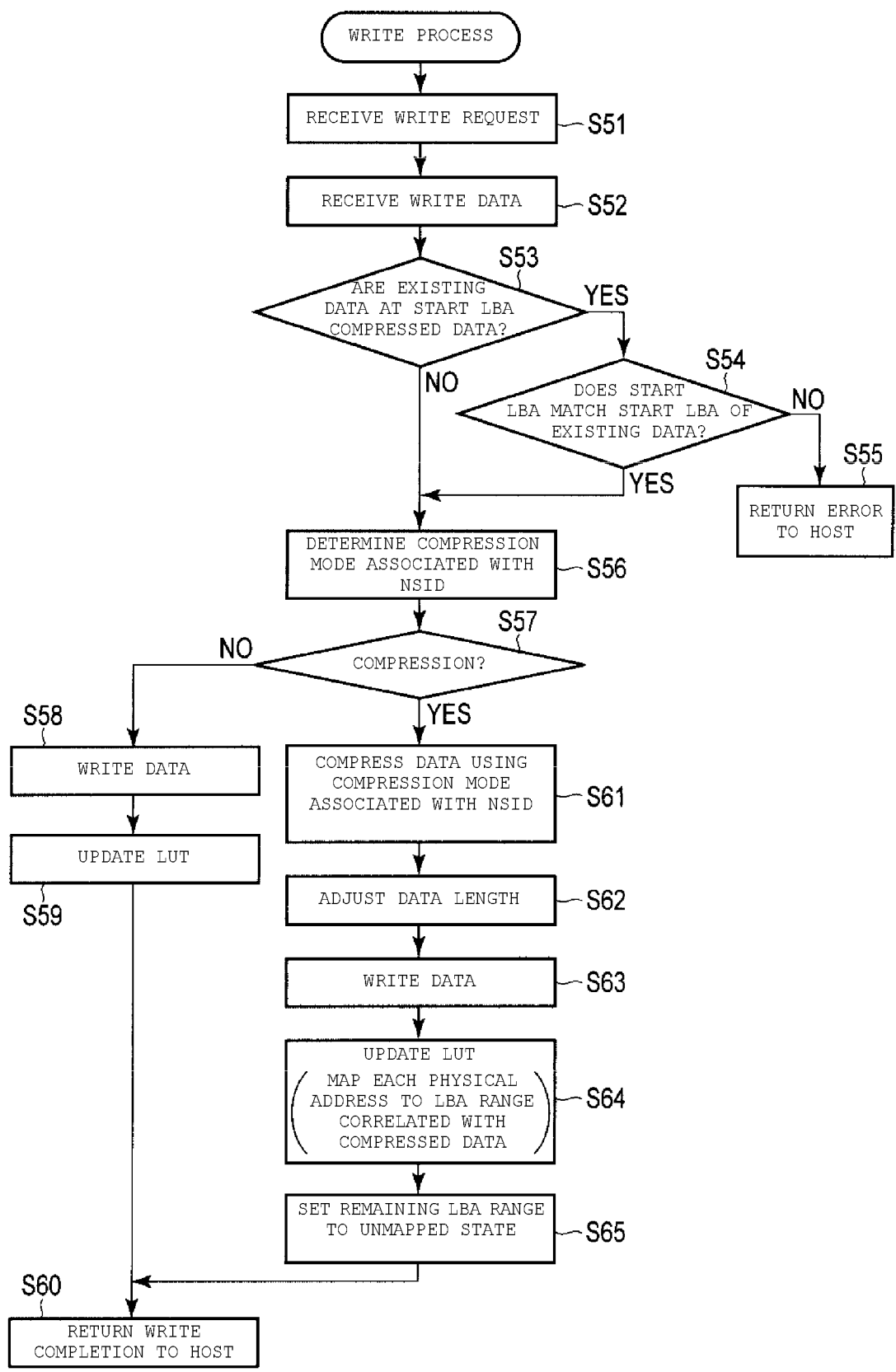
FIG. 16 is a flowchart illustrating another procedure of the write process executed by the storage system according to the embodiment.

FIG. 16 illustrates a procedure of a write process of writing data to a designated namespace.

The controller 4 of the SSD 3 receives a write request (write command) and data to be written (write data) from the host 2 (step S51 and S52). The controller 4 determines whether or not existing data at the start LBA of the write command are the compressed data (step S53). If the existing data at the start LBA of the write command are compressed data (YES in step S53), the controller 4 determines whether or not the start LBA of the write command matches the start LBA of the existing data (compressed data) (step S54). If the start LBA of the write command does not match the start LBA of the existing data (compressed data) (NO in step S54), the controller 4 recognizes that the write target LBA range designated by a pair of the start LBA and the data length which are contained in the write command as the LBA range starting from an intermediate LBA in the LBA range of the existing data (compressed data), and returns a response indicating an error to the host 2, without executing the write command (step S55).

If the existing data at the start LBA of the write command is not compressed data (NO in step S53), or if the existing data at the start LBA of the write command are compressed data and the start LBA of the write command matches the start LBA of the existing data (compressed data) (YES in step S54), the controller 4 executes the write command.

In this case, first, the controller 4 checks the compression mode information associated with the NSID in the write command (step S56), and determines which one of the compression mode and the non-compression mode is associated with the NSID (step S57).

If the non-compression mode is associated (NO in step S57), the controller 4 writes the write data to the physical storage position of the NAND flash memory 5, that is, each of the available pages in the current write destination block which are allocated for the namespace of the NSID (step S58), updates the LUT for the namespace of the NSID, maps each physical address of the physical storage position to each LBA in the LBA range of the write data (step S59), and returns a response indicating write completion to the host 2 (step S60).

If the compression mode is not associated (YES in step S57), the controller 4 compresses the write data, using the designated compression method which is associated with the NSID (a default compression method or a compression method which is explicitly designated in the extension namespace management command), and determines the data length of the compressed data (step S61). The controller 4 may adjust the data length of the compressed data by rounding off the data length of the compressed data to units of 4 KB (management size units) (step S62). The controller 4 writes the compressed data to the physical storage position of the NAND flash memory 5, that is, each of the available pages of the current write destination block which is allocated for the namespace of the NSID (step S63). The controller 4 updates the LUT for the namespace of the NSID, and maps the physical address of each physical storage position to which the compressed data (valid data) are written, to each LBA in the LBA range in which the compressed data (valid data) are written (step S64). The LBA range in which the compressed data are written starts at the start LBA in the write command, and has a range correlated with the data length of the compressed data. The controller 4 sets each LBA in a remaining LBA range correlated with the difference between the data length of the write data and the data length of the compressed data, to an unmapped state where the physical addresses are not mapped (step S65). Thereafter, the controller 4 returns a response indicating the write completion to the host 2 (step S60). This response may include a parameter (return value) indicating the data length of the compressed data, in order to notify the host 2 of the compressed data length.

Figure 17:
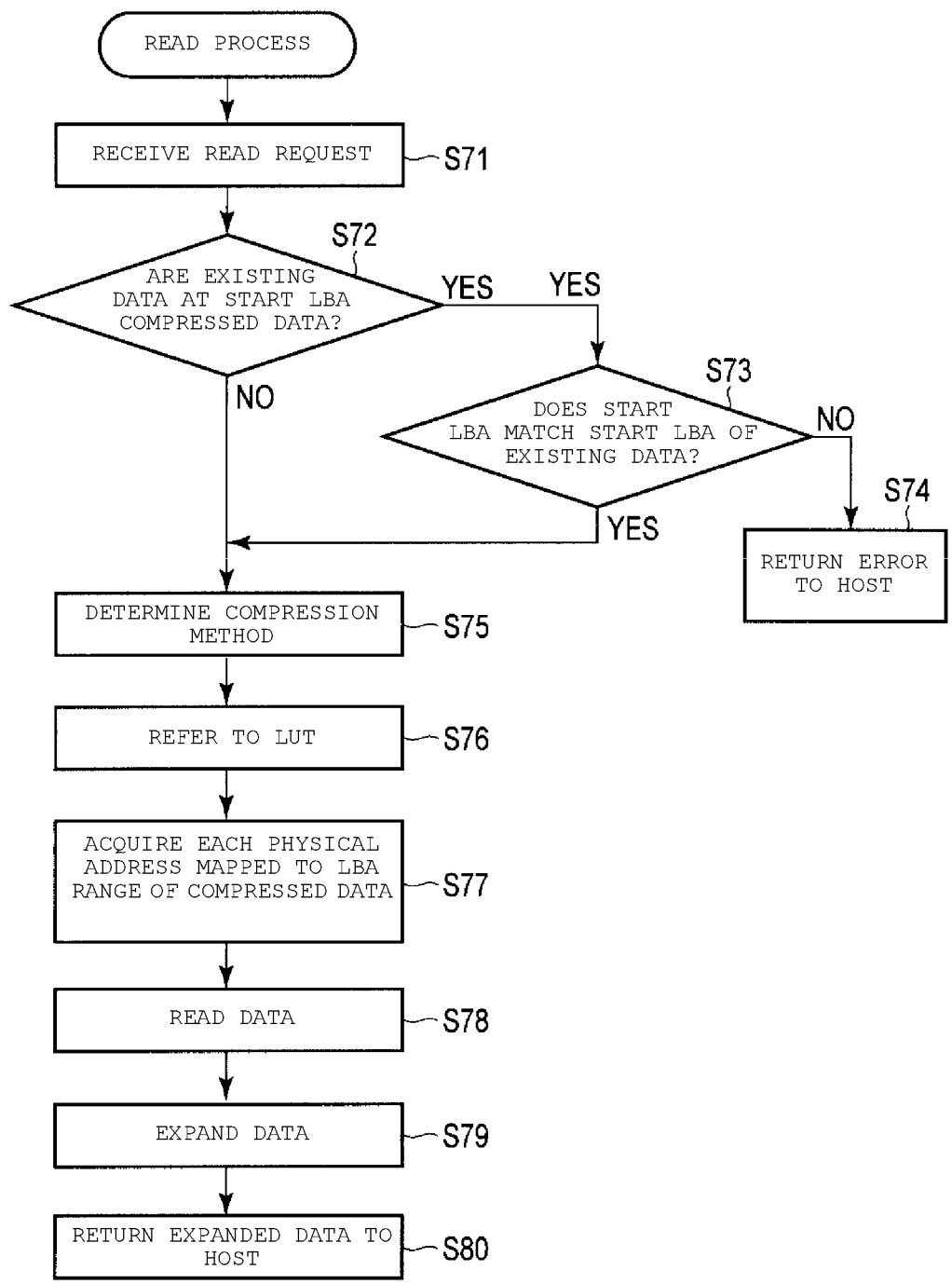
FIG. 17 is a flowchart illustrating a procedure of a read process executed by the storage system according to the embodiment.

FIG. 17 illustrates a procedure of a read process executed by the SSD 3.

The controller 4 of the SSD 3 receives a read request (read command) from the host 2 (step S71). The controller 4 determines whether or not existing data at the start LBA of the read command are compressed data (step S72). If the existing data at the start LBA of the read command is compressed data (YES in step S72), the controller 4 determines whether or not the start LBA of the read command matches the start LBA of the existing data (compressed data) (step S73). If the start LBA of the read command does not match the start LBA of the existing data (compressed data) (NO in step S73), the controller 4 recognizes that the LBA range for reading target designated by a pair of the start LBA and the data length contained in the read command, as the LBA range that starts at an intermediate LBA in the LBA range of the existing data (compressed data), and returns a response indicating an error to the host 2, without executing the read command (step S74).

If the existing data at the start LBA of the read command are not compressed data (NO in step S72), or if the existing data at the start LBA of the read command are compressed data and the start LBA of the read command matches the start LBA of the existing data (compressed data) (YES in step S73), the controller 4 executes the read command.

In this case, the controller 4 determines the compression mode of the existing data in order to determine whether the existing data correlated with the LBA range of the read target which is designated by the start LBA and the data length contained in the read command, are compressed data or uncompressed data (step S75). In the following, it is assumed that the existing data correlated with the LBA range of the read target is compressed data.

The controller 4 refers to the LUT 32 (step S76), and acquires each physical address which is mapped to each LBA in the LBA range of the read target (step S77). In the present embodiment, physical addresses are allocated only to the first range (the LBA range correlated with each physical storage position to which the compressed data are written) in the LBA range, and physical addresses are not allocated to the remaining range of the LBA range. For that reason, the controller 4 reads the compressed data from the NAND flash memory 5, based on the physical address correlated with each LBA in the first range (step S78). The controller 4 expands the read compressed data (step S79), and returns the data obtained by the expansion to the host 2 (step S80). In step S79, the controller 4 is able to expand the read compressed data to the original data length by referring to the corresponding "uncompressed data length" field.

Figure 18:
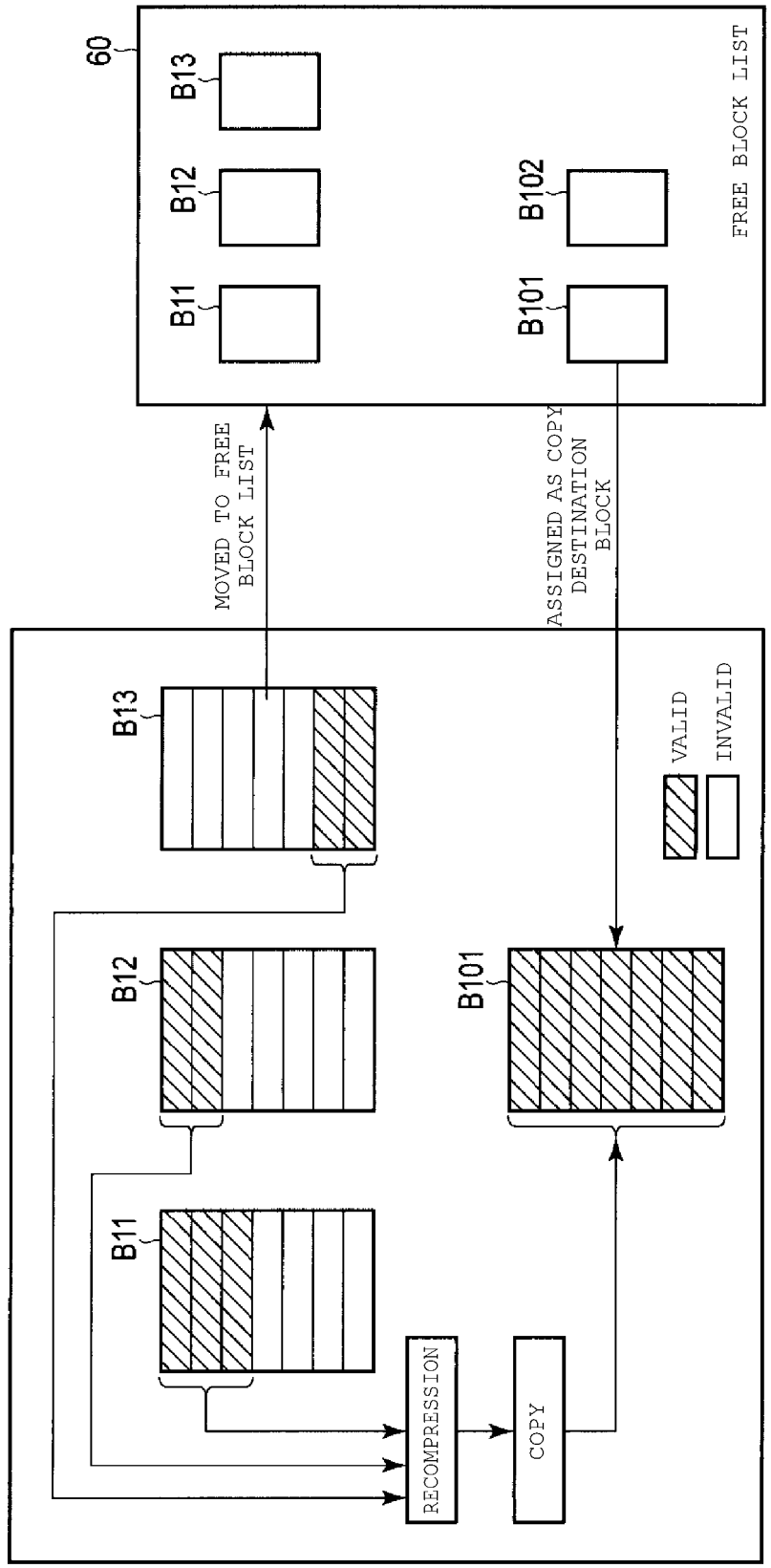
FIG. 18 illustrates a garbage collection operation executed by the storage system according to the embodiment.

FIG. 18 illustrates the garbage collection (GC) operation performed by the SSD 3.

The controller 4 selects one or more GC target blocks from the block group in which valid data and invalid data coexist. In FIG. 18, it is assumed that the blocks B11, B12 and B13 are selected as the GC target blocks. In addition, the controller 4 manages a free block pool (free block list) 60 including all of the free blocks. The controller 4 allocates one free block B101 as the copy destination block from these free blocks. The controller 4 copies only valid data of each GC target block to the copy destination block.

If the valid data are compressed data, the controller 4 generates compressed data having the data length shorter than that of the valid data, by recompressing the valid data. The controller 4 copies the generated compressed data to the copy destination free block.

Figure 19:
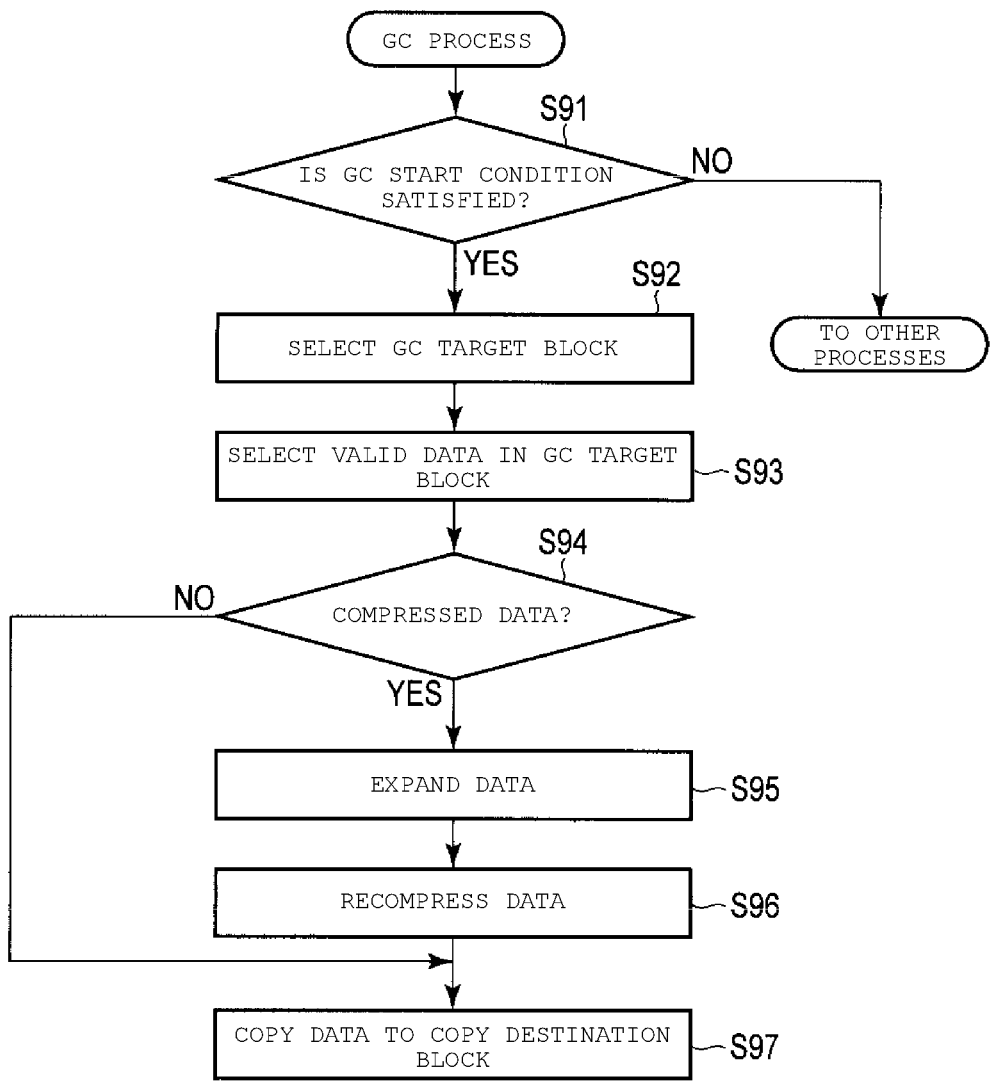
FIG. 19 is a flowchart illustrating a procedure of the garbage collection operation executed by the storage system according to the embodiment.

FIG. 19 illustrates a procedure of the garbage collection process executed by the SSD 3.

The controller 4 of the SSD 3 determines whether or not a GC start condition is satisfied (step S91). The GC start condition is a condition for starting the GC operation. For example, if the number of remaining free blocks is a threshold value or less, or a command to request for GC start is received from the host 2, the controller 4 determines that the GC start condition is satisfied.

If the GC start condition is satisfied (YES in step S91), the controller 4 selects one or more blocks in which valid data and invalid data coexist, as GC target blocks (step S92).

The controller 4 selects valid data in a certain GC target block (step S93), reads the valid data, and determines whether or not the valid data are compressed data (step S94).

If the read valid data is compressed data (YES in step S94), the controller 4 expands the compressed data (step S95), compresses (recompresses) the expanded data using another compression method with a compression rate higher than that of the compression method which was applied to the read compressed data, and generates the compressed data (recompressed data) of a data length shorter than that of the compressed data (step S96). The controller 4 copies (compression and writing) the recompressed data to the copy destination block (step S97). In step S97, the LBA range correlated with the uncompressed data length of the read compressed data is logically divided into a LBA range # A having a range which starts at the start LBA of the LBA range and is correlated with the data length of the recompressed data and a LBA range # B correlated with a difference between the uncompressed data length and the recompressed data. The LUT 32 is updated, each physical address of a copy destination block is mapped only to the LBA range # A, and the LBA range # B is set to the unmapped state.

If the read valid data are not the compressed data (NO in step S94), the controller 4 copies the read valid data to the copy destination block (step S97). In step S97, each physical address of the copy destination block is mapped to each LBA in the LBA range of the read valid data.

Figure 20:
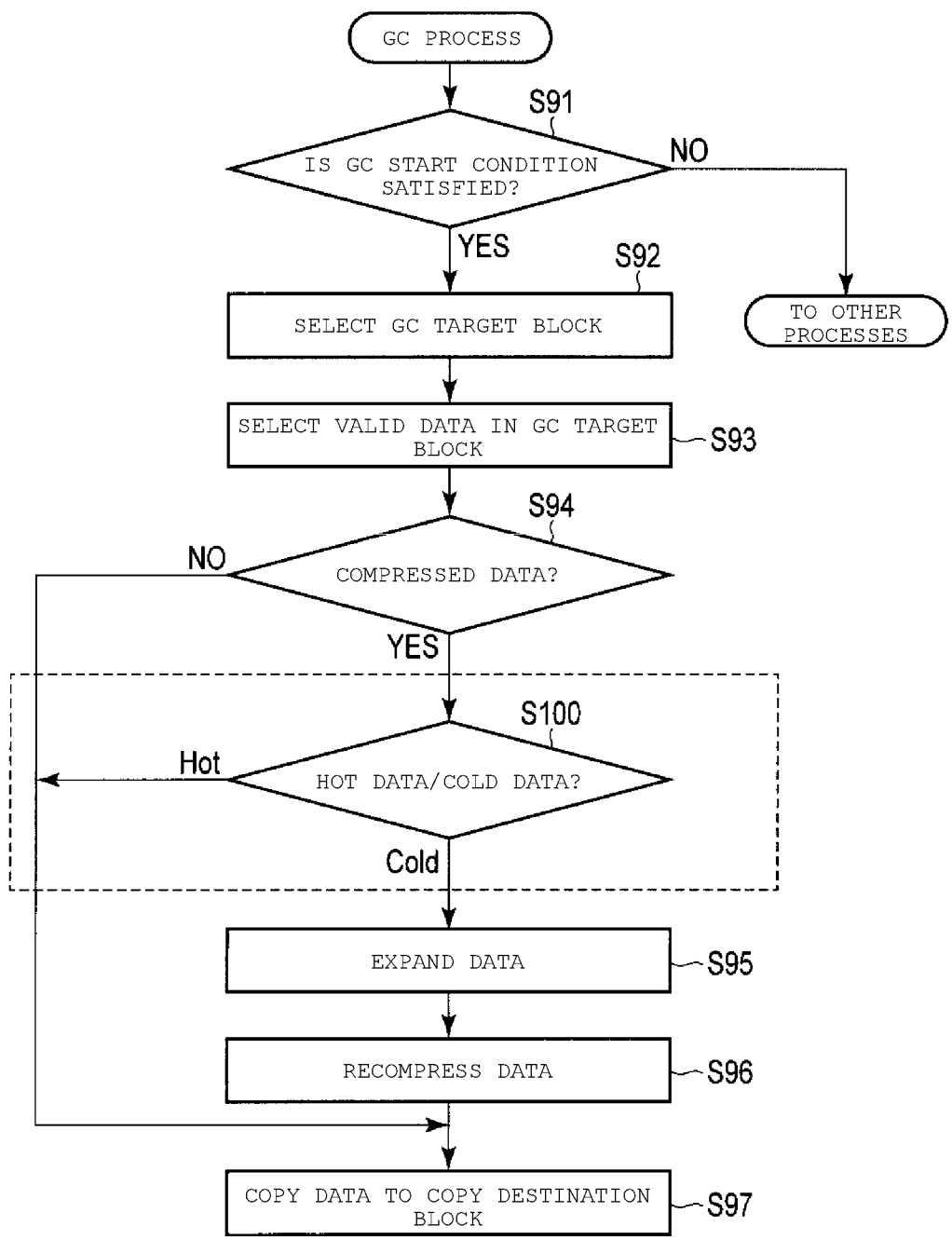
FIG. 20 is a flowchart illustrating another procedure of the garbage collection operation executed by the storage system according to the embodiment.

FIG. 20 illustrates another procedure of the garbage collection process executed by the SSD 3. Here, step S100 is carried out between step S94 and step S95 of FIG. 19.

If the read valid data are compressed data (YES in step S94), the controller 4 determines whether the read valid data (compressed data) are data (hot data) which are frequently updated, or, data (cold data) which are not frequently updated or are not updated (step S100). The hot data are first-type data having a certain high update frequency. The cold data is second-type data having a update frequency lower than the update frequency of the hot data.

If the read valid data are hot data, for example, even if the valid data are recompressed at a high compression rate, the recompressed data are likely to be rewritten again. For that reason, in the present embodiment, if the read valid data (compressed data) are cold data, recompression is performed.

In other words, if the read valid data (compressed data) are cold data, the controller 4 expands the read valid data (compressed data) (step S95), compresses (recompresses) the expanded data using another compression method with a compression rate higher than that of the compression method which was applied to the read compressed data, and generates the compressed data (recompressed data) of a data length shorter than that of the compressed data (step S96). The controller 4 copies (compression and writing) the recompressed data to the copy destination block (step S97).

In this way, it is possible to further reduce the physical memory capacity required to store the host data, by recompressing the cold data and copying the data to the copy destination block during the GC.

An example of a method for determining hot data/cold data will be described.

The controller 4 may manage a block use order management list. The block use order management list indicates an allocated number (sequential number) which is assigned to each block which is allocated for the write destination block. In other words, the controller 4 gives a number indicating the allocated sequence (allocated number) for each block which is allocated as the write destination block. The number may be a sequential number starting with 1. For example, the allocated number=1 is assigned to a block which is allocated at first for the write destination block, the allocated number=2 is assigned to a block which is secondly allocated for the write destination block, and the allocated number=3 is assigned to a block which is thirdly allocated for the write destination block. In this manner, it is possible to manage a block usage history indicating a block which is allocated as the write destination block and an order in which the allocation is performed. The value of the counter which is incremented each time a new free block is allocated for the write destination block can be used as the allocated number.

The valid data being in a block to which an old allocated number is assigned is data that have not been updated so far. Therefore, for example, if a difference between the allocated number of the current write destination block and the allocated number of the GC target block is the threshold value or more, the controller 4 may determine that the valid data in the GC target block are cold data.

Alternatively, the controller 4 may manage the GC count management list. The GC count management list is a list indicating a garbage collection count (GC count) for each block including data written by the host 2. The GC count indicates a count when data in each block including data written by the host 2 are copied to the block through the garbage collection (GC) operation. The GC count management list maybe configured with a plurality of GC count lists for managing each block for each of GC counts (for example, GC count=0 to GC count=n). Here, n is the upper limit of the GC count to be managed. For example, the GC count list of GC count=0 retains the list of the block ID (for example, the physical block address) of each block which is associated with the GC count of 0. The GC count list of GC count=1 indicates the list of the block ID (for example, the physical block address) of each block which is associated with the GC count of 1.

Figure 21:
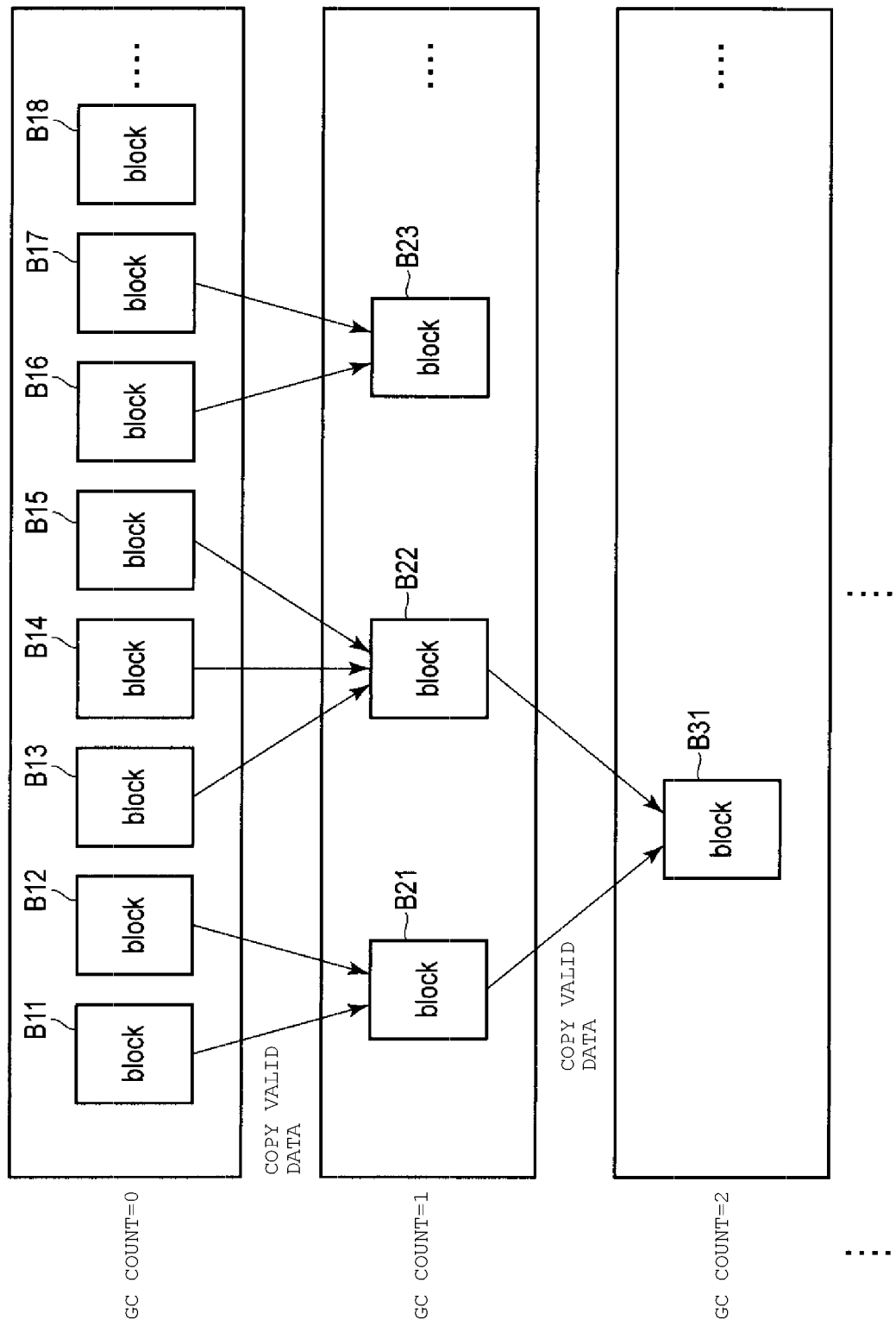
FIG. 21 illustrates a garbage collection count management operation and the garbage collection operation executed by the storage system according to the embodiment.

FIG. 21 illustrates the GC count management operation and the GC operation which are executed by the SSD 3.

The controller 4 of the SSD 3 allocates a certain free block as the write destination block for writing data (write data) from the host 2, and sequentially writes the write data receive from the host 2 to each available page in the write destination block. When all pages of the current write destination block are filled with data, the controller 4 manages the current write destination block as an active block (block including data). Further, the controller 4 allocates another free block as a new write destination block. Thus, in the SSD 3, the data (write data) received from the host 2 are sequentially written from the first page to the last page of the current write destination block, in its order of reception.

The blocks B11 to B18 of FIG. 21 area blocks immediately subsequent to a block to which data are written by the host 2, that is, a block in which no data are copied during the garbage collection (GC) operation. The GC count correlated with these blocks B11 to B18 is 0.

Each piece of data in the blocks B11 to B18 may be disabled by the rewriting, as time passes. That is, valid data and invalid data may coexist in each of the blocks B11 to B18.

If the number of free blocks decreases to a threshold value, the controller 4 starts a GC operation for generating a free block from some blocks in which valid data and invalid data coexist.

First, the controller 4 selects some blocks in which valid data and invalid data coexist, as GC target blocks. In the selection of the GC target blocks, the controller 4 selects a block group associated with the same GC count as the GC target blocks.

The controller 4 copies valid data in the selected GC target blocks (some blocks associated with the same GC count) to the copy destination block, and sets a value obtained by adding 1 to the GC count of these GC target blocks to the GC count of the copy destination block. Since the value obtained by adding 1 to the GC count of the GC target block is taken over to the copy destination block, the GC count of the copy destination block correctly represents the number of times data in the copy destination block were copied in the past through the GC operation.

For example, if two blocks B11 and B12 associated with the same GC count are selected as the GC target blocks and valid data in these blocks B11 and B12 are copied to the copy destination block B21, the GC count of the copy destination block B21 is set to a value (here, 1) obtained by adding 1 to the GC count (here, 0) of the blocks B11 and B12.

Similarly, if three blocks B13, B14 and B15 associated with the same GC count are selected as the GC target blocks and valid data in these blocks B13, B14 and B15 are copied to the copy destination block B22, the GC count of the copy destination block B22 is set to a value (here, 1) obtained by adding 1 to the GC count (here, 0) of the blocks B13, B14 and B15.

Similarly, if two blocks B16 and B17 associated with the same GC count are selected as the GC target blocks and valid data in these blocks B16 and B17 are copied to the copy destination block B23, the GC count of the copy destination block B23 is set to a value (here, 1) obtained by adding 1 to the GC count (here, 0) of the blocks B16 and B17.

Each piece of data in the blocks B21, B22, and B23 may be invalidated by the rewriting, as time passes. For that reason, valid data and invalid data may coexist, in each of the blocks B21, B22, and B23.

If two blocks B21 and B22 associated with the same GC count are selected as the GC target blocks and the valid data in these blocks B21 and B22 are copied to the copy destination block B31, the GC count of the copy destination free block B31 is set to a value (here, 2) obtained by adding 1 to the GC count (here, 1) of the blocks B21 and B22.

In this manner, the GC count managed for each block represents the number of times data in the block were copied in the past through the GC operation. Since the GC count is correctly managed, the value obtained by adding 1 to the GC count of the GC target block is taken over to the data in the copy destination free block.

FIG. 22 illustrates an example of the GC count management list.

If the upper limit n of the GC count to be managed is, for example, 10, the GC count management list may be configured with 11 GC count lists which are respectively correlated with GC count=0 to GC count=10.

The GC count list of GC count=0 represents the block ID (for example, the physical block address) of each block which is associated with the GC count=0. The GC count list of GC count=1 represents the block ID (for example, the physical block address) of each block which is associated with the GC count=1. Similarly, the GC count list of GC count=10 represents the block ID (for example, the physical block address) of each block which is associated with the GC count=10. Any other GC count list that can include only a block in which valid data and invalid data coexist may be used.

Figure 23:
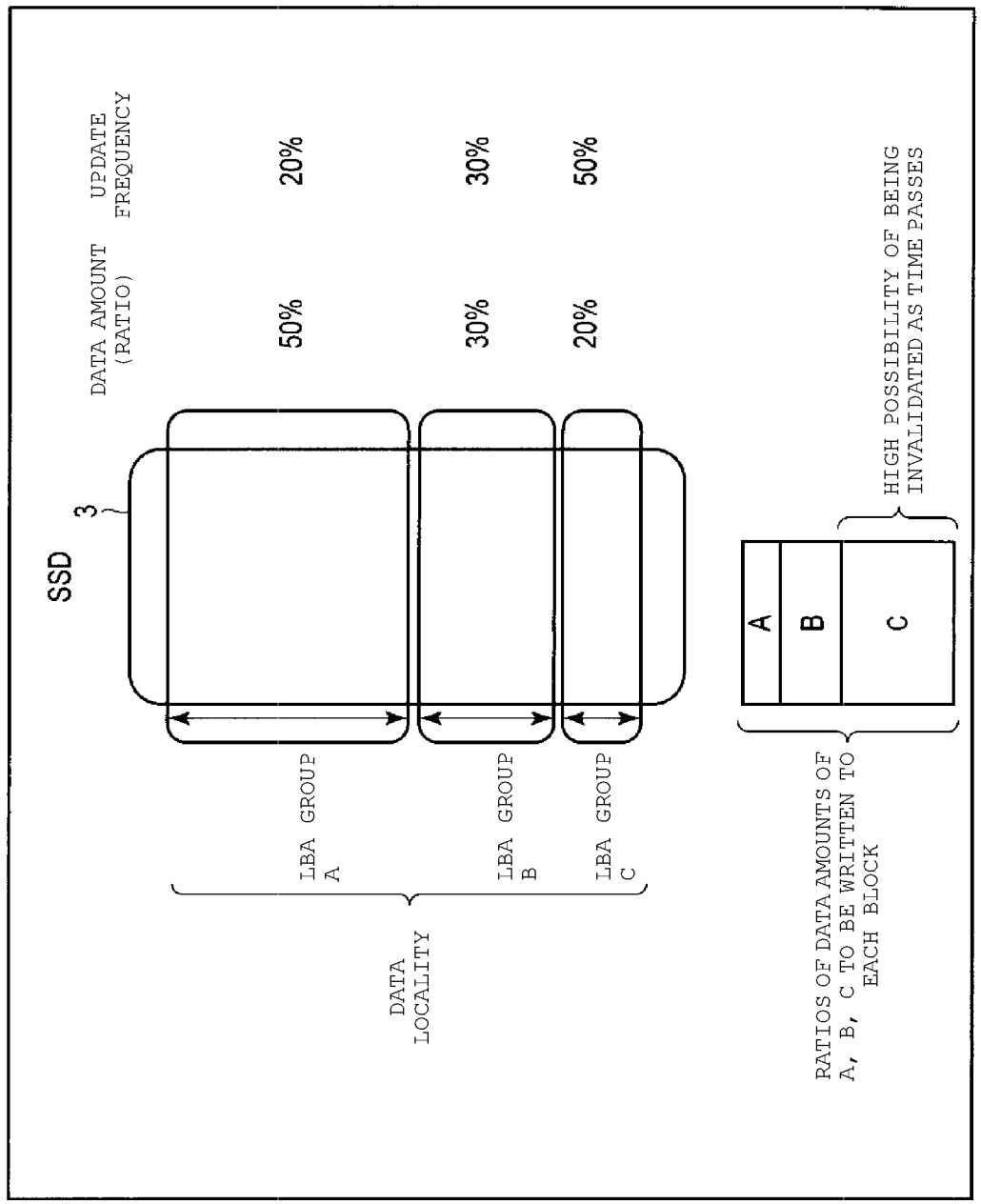
FIG. 23 illustrates an example of a plurality types of data written to the storage system according to the embodiment.

FIG. 23 illustrates an example of a plurality of types of data which are written to the SSD 3.

In FIG. 23, it is assumed that three types of data (data A, data B, and data C) having different update frequency are written to the SSD 3. The data storing area (LBA space) of the SSD 3 includes three spaces correlated with the LBA groups A, B, and C.

The data A written to the LBA group A are data having a low update frequency, and an amount of the data A is the greatest among the data A, B, and C. In other words, the LBA group A has the greatest LBA range.

The data C written to the LBA group C are data having a high update frequency, and the amount of the data C is the smallest among the data A, B, and C. In other words, the LBA group C has the smallest LBA range.

The data B written to the LBA group B are data having an intermediate update frequency of the data A and the data C, and the amount of the data B is an intermediate of the amount of the data A and the amount of the data C.

The ratio of the amount of the data A to the total user capacity of the SSD 3 may be, for example, 50%. The ratio of the amount of the data B to the total user capacity of the SSD 3 may be, for example, 30%. The ratio of the amount of the data C to the total user capacity of the SSD 3 may be, for example, 20%.

The update frequency of the data A, that is, the frequency of writing to the LBA group A may be, for example, 20%. The update frequency of the data B, that is, the frequency of writing to the LBA group B may be, for example, 30%. The update frequency of the data C, that is, the frequency of writing to the LBA group C may be, for example, 50%.

In this case, for example, after the SSD 3 is filled with data A, data B, and data C, a write command to request writing to the data C (LBA group C) is issued from the host 2 to the SSD 3 in a ratio of one to two write commands (50%), and a write command to request writing to the data A (LBA group A) is issued from the host 2 to the SSD 3 in a ratio of one to five write commands (20%). For example, the data C are updated at a high frequently such as a ratio of one to two write commands (50%).

If the data to be written to the SSD 3 have a data structure as shown in FIG. 23, as illustrated in the lower part of FIG. 23, the data A, the data B, and the data C coexist in each write destination block.

In one write destination block, the ratio of the amount of the data C to the capacity of the block is 50%, the ratio of the amount of the data B to the capacity of the block is 30%, and the ratio of the amount of the data A to the capacity of the block is 20%.

As described above, since the amount of the data C is smaller than those of the data A and the data B, and the update frequency of the data C is higher than those of the data A and the data B, there is a high possibility that most of the data C in each block are disabled at a faster timing. On the other hand, there is a high possibility that with respect to the data A and the data B, especially the data A are maintained in a valid state for a longer period of time.

Each block in which the amount of invalid data increases due to the update (rewriting) of the data C become a GC target block, and valid data are copied to the copy destination block from these blocks. There is a high possibility that the amount of the data C is large but it is disabled and the amounts of the data A and the data B are large but are maintained in the valid data, in each GC target block. For that reason, in the copy destination block, the amount of the data A and the amount of the data B are increased as compared to the GC target block, and instead, the amount of the data C is reduced as compared to the GC target block.

In the present embodiment, since the valid data in some blocks of the same GC count are copied to the copy destination free block, the valid data in blocks having a small GC count and the valid data in blocks having a large GC count are not copied to the same copy destination free blocks through the GC operation. Therefore, as the block has the greater GC count, the ratio of the amount of the data A to the capacity of the block can be increased, and this allows the data A (cold data) to be separated from the data C (hot data).

Figure 24:
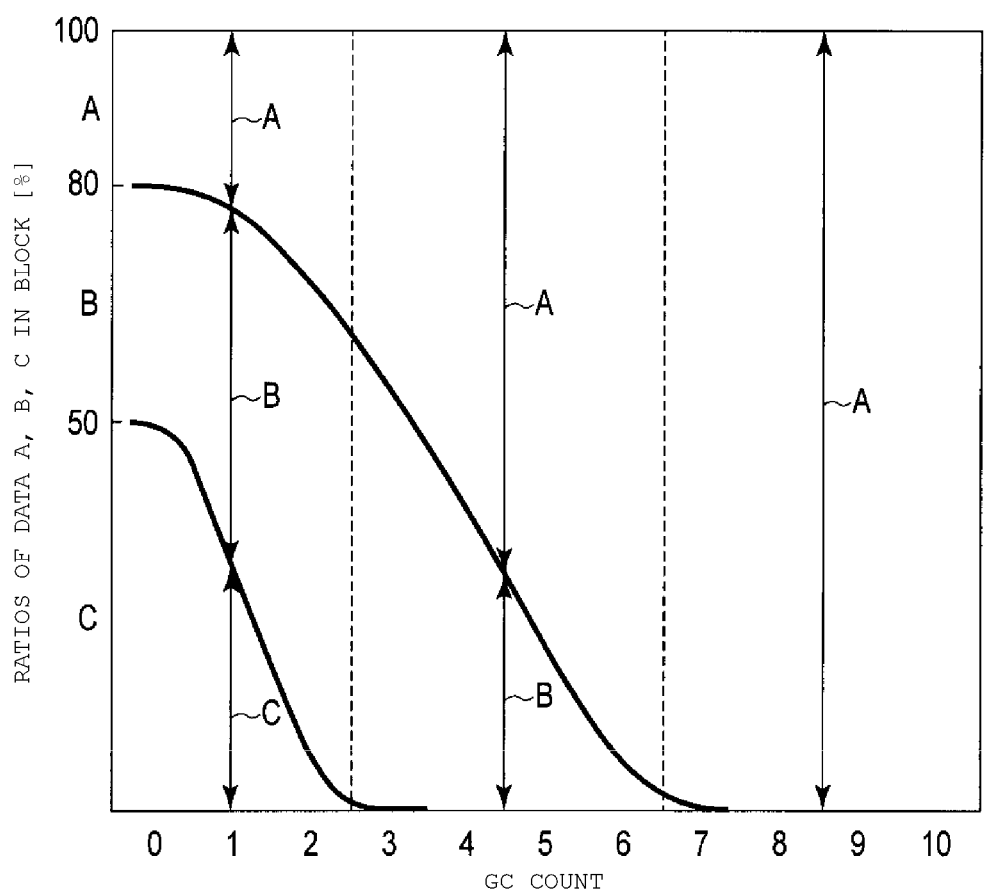
FIG. 24 illustrates an example of a relationship between the garbage collection count and the ratios of the data amounts of the plurality types of data.

FIG. 24 illustrates a relationship between the GC count and the ratio of the data amounts of the data A, B and C in each block.

In each block of GC count=0, the ratio of the amount of the data C to the capacity of the block is 50%, the ratio of the amount of the data B to the capacity of the block is 30%, and the ratio of the amount of the data A to the capacity of the block is 20%.

The ratio of the amount of data C to the capacity of the block is quickly reduced through the GC operation once or twice. As the GC count increases, the ratio of the amount of data B to the capacity of the block is also gradually reduced.

As described above, in the present embodiment, since the valid data in blocks having a small GC count and the valid data in blocks having a large GC count are not copied to the same copy destination free blocks, each block including data can be divided into (1) a group which contains almost only data A (for example, about GC count 7 to 10), (2) a group including the data A and the data B, and does not include most of the data C (for example, about GC count 3 to 6), and (3) a group including the data A, the data B, and the data C (for example, about GC count 0 to 2).

In this way, for each block including the data that are written by the host 2, the GC count indicating the number of times that the data in the block are copied through the garbage collection (GC) operation is managed, during the GC operation, a plurality of blocks associated with the same GC count are selected as the GC target blocks. Then, the valid data in these first blocks are copied to the copy destination block, and a value obtained by adding 1 to the GC count of the GC target block is set as the GC count of the copy destination block. Since it is possible to prevent data having a high update frequency and data having a low update frequency from being copied together to the same block through the GC operation, it is possible to collect the cold data to blocks having a great GC count.

Figure 25:
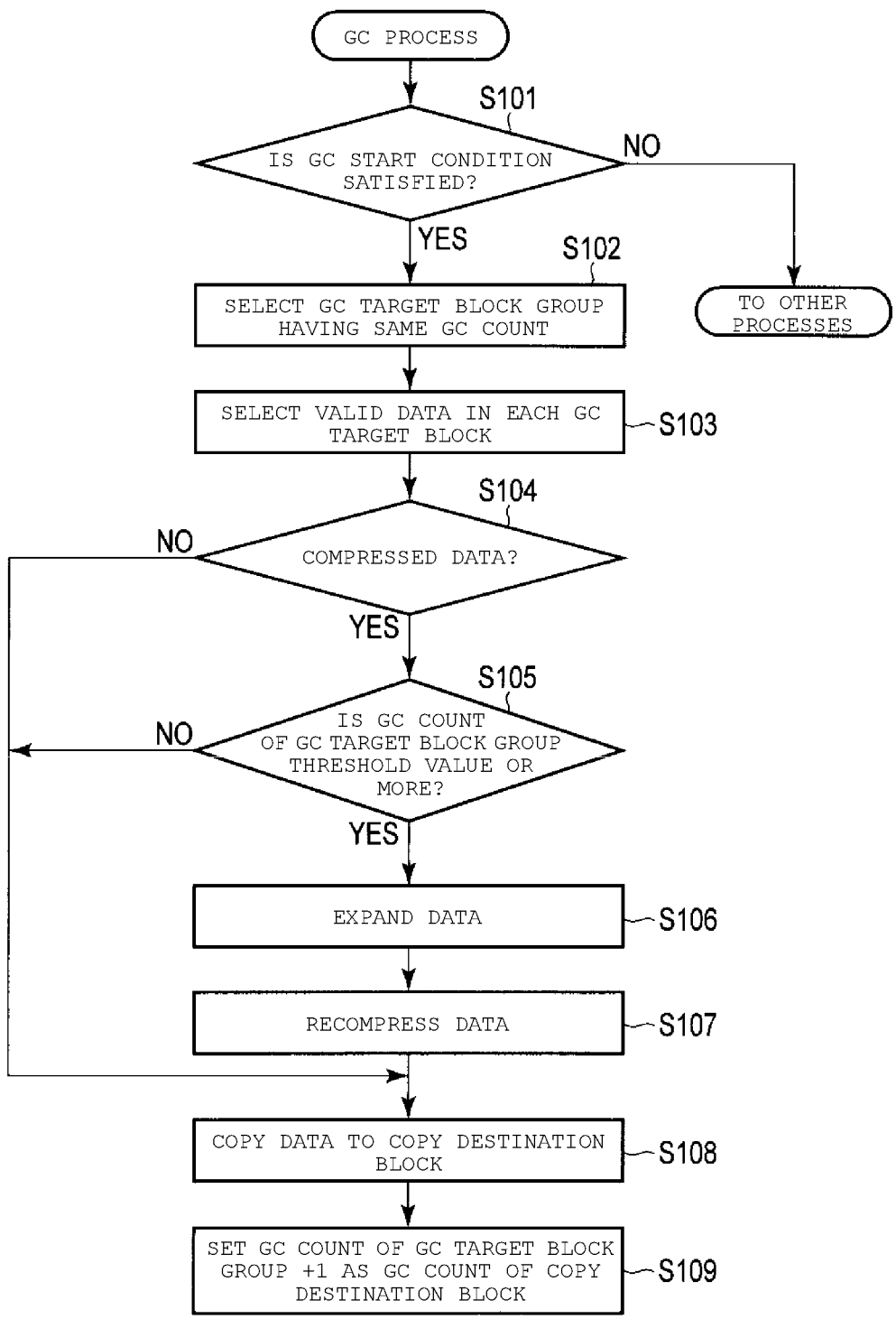
FIG. 25 is a flowchart illustrating another procedure of the garbage collection operation executed by the storage system according to the embodiment.

FIG. 25 illustrates a procedure of a GC process including a process of determining hot/cold using the GC count.

The controller 4 of the SSD 3 determines whether or not the GC start condition is satisfied (step S101). The GC start condition is a condition for starting the GC operation. For example, if the number of remaining free blocks reaches a threshold value, or a command to request for GC start is received from the host 2, the controller 4 determines that the GC start condition is satisfied.

If the GC start condition is satisfied (YES in step S101), the controller 4 selects a block group having the same GC count as GC target blocks (step S102).

The controller 4 selects valid data in a certain GC target block (step S103), reads the valid data, and determines whether or not the valid data are compressed data (step S104).

If the read valid data are compressed data (YES in step S104), the controller 4 determines whether or not the GC count of the GC target block is a threshold value or more (step S105). If the GC count of the GC target block is the threshold value or more (YES in step S105), the controller 4 is able to determine that the read valid data (compressed data) are cold data.

If the GC number of GC target block is equal to or greater than the threshold (YES in step S105), the controller 4 expands the read valid data (compressed data) (step S106), compresses (recompresses) the expanded data using another compression method with a compression rate higher than that of the compression method which was applied to the read compressed data, and generates the compressed data (recompressed data) of a data length shorter than that of the compressed data (step S107). The controller 4 copies (compression and writing) the recompressed data to the copy destination block (step S108). In step S108, the LBA range correlated with the uncompressed data length of the read compressed data is logically divided into a LBA range # A having a range which starts at the start LBA of the LBA range and is correlated with the data length of the recompressed data and a LBA range # B correlated with a difference between the uncompressed data length and the recompressed data. Each physical address of a copy destination block is mapped only to the LBA range # A, and the LBA range # B is set to the unmapped state.

Thereafter, the controller 4 sets the GC count of the GC target block as the GC count of the copy destination block (step S109).

If the read valid data are not compressed data (NO in step S104), the controller 4 copies the read valid data to the copy destination block, without executing the process of step S105 to S107 (step S108). Then, the process proceeds to step S109.

If the read valid data are compressed data but the GC number of GC target blocks is less than the threshold value (NO in step S105), the controller 4 copies the read valid data (compressed data) to the copy destination block, without executing the process of step S106 and S107 (step S108). Then, the process proceeds to step S109.

Figure 26:
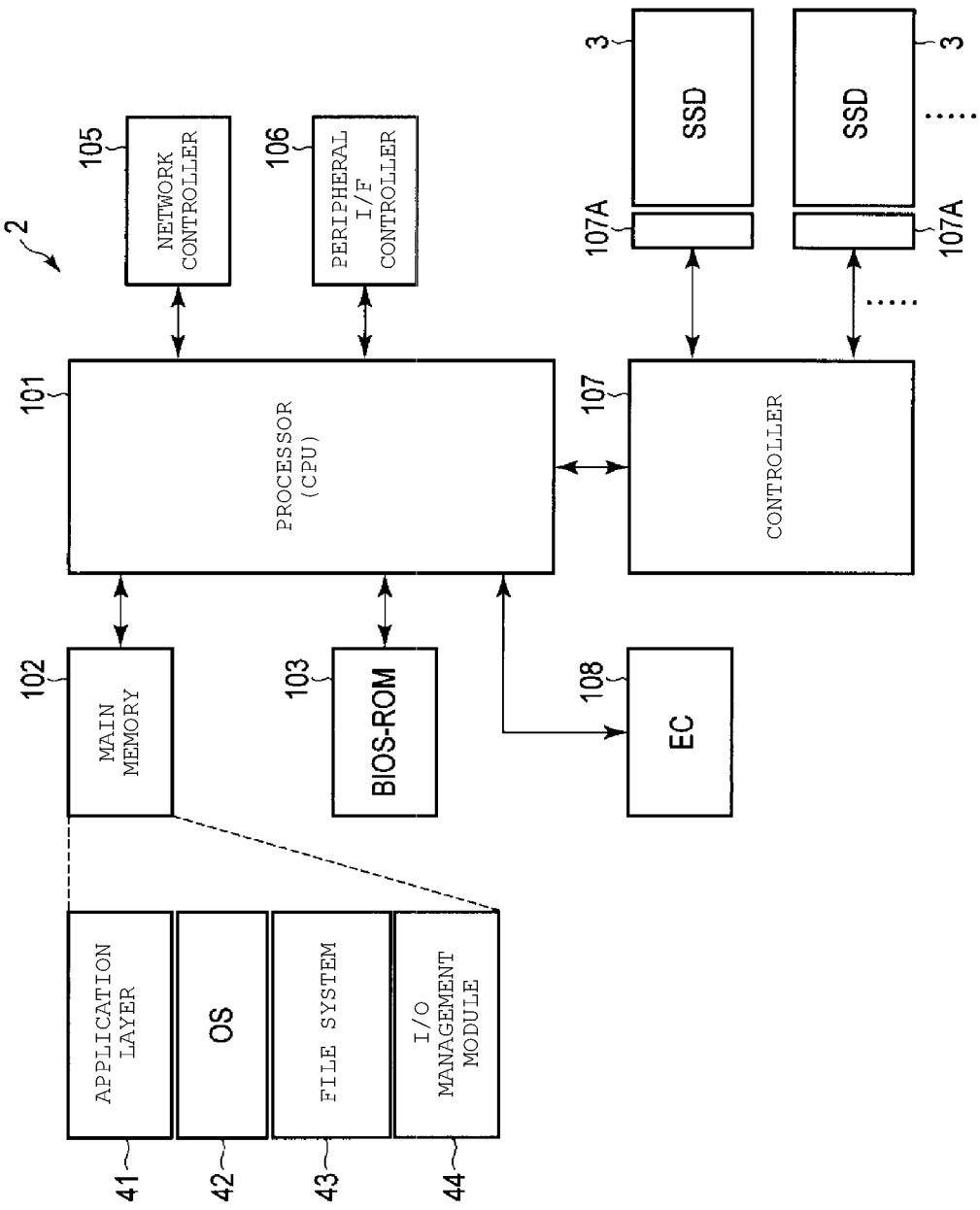
FIG. 26 is a block diagram of a host.

FIG. 26 illustrates a hardware configuration example of an information processing apparatus (computing device) that functions as the host 2.

The information processing apparatus is formed as a computing device such as a server (for example, a storage server). The information processing apparatus includes a processor (CPU) 101, main memory 102, BIOS-ROM 103, a network controller 105, a peripheral interface controller 106, a controller 107, an embedded controller (EC) 108, and the like.

The processor 101 is a CPU which is configured to control an operation of each component of the information processing apparatus. The processor 101 executes a variety of software programs to be loaded from any one of a plurality of SSDs 3 to the main memory 102. The main memory 102 is configured with a random access memory such as a DRAM. The software program executed by the processor 101 includes an application software layer 41, an OS 42, and a file system 43 which are described above. Further, the software program executed by the processor 101 may include an I/O management module 44. The I/O management module 44 sends data I/O requests (a write request and a read request) to the SSDs 3, in units of the minimum data length or in units of a data length of an integer multiple of the minimum data length. The I/O management module 44 may be included in the application software layer 41, or may be included in the OS 42 or the file system 43.

The I/O management module 44 executes the data management described in FIG. 5, using the LBA space of the SSD 3. As described above, the controller 4 of the SSD 3 may report the capacity larger than the capacity of the NAND flash memory 5 as the capacity of the SSD 3 to the host 2. The I/O management module 44 is able to execute the data management described in FIG. 5, using the LBA space correlated with the capacity that is reported from the SSD 3.

Further, the processor 101 is to also execute a basic input/output system (BIOS) stored in the BIOS-ROM103 in the nonvolatile memory. The BIOS is a system program for hardware control.

The network controller 105 is a communication device such as a wired LAN controller and a wireless LAN controller. The peripheral interface controller 106 is configured to perform communication with the peripheral device such as a USB device.

The controller 107 is configured to perform communication with devices which are respectively connected to a plurality of connectors 107A. In the present embodiment, a plurality of SSDs 3 is respectively connected to the plurality of connectors 107A. The controller 107 is a SAS expander, a PCIe switch, a PCIe expander, a flash array controller, a RAID controller, or the like.

The EC 108 functions as a system controller which is configured to perform power management of the information processing apparatus. The EC 108 turns on or turns off the information processing apparatus in response to an operation of the power switch by the user. The EC 108 is formed as a processing circuit such as a one chip microcontroller. The EC 108 includes a keyboard controller that controls the input device such as a keyboard (KB).

FIG. 27 illustrates a configuration example of the information processing apparatus including a plurality of SSDs 3 and the host 2.

The information processing apparatus includes a thin box-shaped housing 201 capable of being accommodated in a rack. A large number of SSDs 3 may be placed in the housing 201. In this case, each SSD 3 may be removably inserted to the slot provided on the front surface 201A of the housing 201.

The system board (mother board) 202 is placed in the housing 201. Various electronic components including a CPU 101, a memory 102, a network controller 105, and a controller 107 are mounted on the system board (motherboard) 202. These electronic components function as the host 2.

As described above, according to the present embodiment, write data having a data length larger than the management size are compressed by the controller 4 of the SSD 3, and the compressed data are written to the memory area of the NAND flash memory 5. A difference between the data length of the write data and the data length of the compressed data is identified by the controller 4, the LUT 32 is automatically update based on the difference, each physical address in the memory area to which the compressed data are written is mapped to each logical address (LBA) in a first range (LBA range # A) which starts at a start logical address (start LBA) of a first logical address range (first LBA range) to which the write data is to be written and is correlated with the data length of the compressed data, and each logical address (LBA) in a second range (LBA range # B) which is subsequent to the first range (LBA range # A), and is correlated with a difference between the data length of the write data (uncompressed data) and the data length of the compressed data is set to a state in which no physical addresses are mapped. Accordingly, a difference area between the data length of the write data and the data length of the compressed data can be handled as a LBA range which is trimmed/unmapped. As a result, even if the data length of the write data is changed to a certain data length by compression, the host 2 is able to execute reading and writing (rewriting) of the data, by using the LBA range correlated with the data length of the uncompressed data. As a result, since the garbage collection on the host 2 side as illustrated in FIG. 2 is not required, an amount of data to be written to the SSD 3 is also reduced, and it is possible to reduce the write amplification of the SSD 3.

In the present embodiment, a NAND memory is exemplified as the nonvolatile memory. However, the functions of the above embodiment can be applied to, for example, various other nonvolatile memories such as a magneto resistive random access memory (MRAM), a phase change random access memory (PRAM), a resistive random access memory (RERAN), or, ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a nonvolatile storage; and
a controller configured to
compress first data received from a host in association with a write command, which designates a first data length as a length of the first data and a starting logical address of the first data, into compressed first data of a second data length shorter than the first data length,
write the compressed first data in the nonvolatile storage,
generate an address mapping for the first data by mapping a first logical address range that starts at the starting logical address and has a length equal to the second data length to a physical region of the nonvolatile storage having a size equal to the second data length and modifying a second logical address range that directly follows the first logical address range and has a length equal to a size difference between the first and second data lengths, such that the second logical address range is not mapped to any physical region of the nonvolatile storage,
write second data received subsequent to the compressed first data in the nonvolatile storage, and
generate an address mapping for the second data by mapping a third logical address range that directly follows the second logical address range to a physical region of the nonvolatile storage in which the second data is written.

2. The storage device according to claim 1, wherein
the controller is further configured to return a response indicating an error, responsive to a read or write command that designates a logical address that is within the first address range that is different from the starting logical address or is within the second address range.

3. The storage device according to claim 1, wherein
the controller is further configured to read the compressed first data from the physical region of the nonvolatile storage, the physical region being determined by referring to the address mapping, responsive to a read command that designates the starting logical address and the first data length.

4. The storage device according to claim 1, wherein
the controller compresses the first data received from the host according to a compression method designated by the write command.

5. The storage device according to claim 1, wherein
the controller is further configured to write the first data received from the host without compressing the first data, when the write command does not designate any data compression.

6. The storage device according to claim 1, wherein
the controller is further configured to independently maintain an address mapping for each of a plurality of namespaces that is established in the storage device, and compress the first data received from the host according to a compression method associated with a namespace designated by the write command.

7. The storage device according to claim 1, wherein
the controller is further configured to select a plurality of blocks of the nonvolatile storage as target blocks for garbage collection, determine whether or not valid data stored in the selected blocks are compressed, expand and re-compress the valid data when the valid data are determined to be compressed, and copy the re-compressed valid data and other valid data from the selected blocks to another block.

8. The storage device according to claim 1, wherein
the controller is further configured to select a plurality of blocks of the nonvolatile storage as target blocks for garbage collection, determine whether or not valid data stored in the selected blocks are compressed, expand and re-compress the valid data when the valid data are determined to be compressed and an update frequency of the valid data is lower than a threshold, and copy the re-compressed valid data and other valid data from the selected blocks to another block.

9. The storage device according to claim 1, wherein
the controller is further configured to count a number of times data stored in each block of the nonvolatile storage have been copied through garbage collection, select a plurality of blocks for which counted numbers are equal as target blocks for garbage collection, determine whether or not valid data stored in the selected blocks are compressed, expand and re-compress the compressed valid data upon determining that the counted number for the target blocks is greater than a threshold, and copy the re-compressed valid data and other valid data from the selected blocks to another block.

10. A method for operating a storage device including a nonvolatile storage, comprising:
compressing first data received from a host in association with a write command, which designates a first data length as a length of the first data and a starting logical address of the first data, into compressed first data of a second data length shorter than the first data length;
writing the compressed first data in the nonvolatile storage;
generating an address mapping for the first data by mapping a first logical address range that starts at the starting logical address and has a length equal to the second data length to a physical region of the nonvolatile storage having a size equal to the second data length and modifying a second logical address range that directly follows the first logical address range and has a length equal to a size difference between the first and second data lengths, such that the second logical address range is not mapped to any physical region of the nonvolatile storage;
writing second data received subsequent to the compressed first data in the nonvolatile storage; and
generating an address mapping for the second data by mapping a third logical address range that directly follows the second logical address range to a physical region of the nonvolatile storage in which the second data is written.

11. The method according to claim 10, further comprising:
returning a response indicating an error, responsive to a read or write command that designates a logical address that is within the first address range that is different from the starting logical address or is within the second address range.

12. The method according to claim 10, further comprising:
reading the compressed first data from the physical region of the nonvolatile storage, the physical region being determined by referring to the address mapping, responsive to a read command that designates the starting logical address and the first data length.

13. The method according to claim 10, wherein
the first data received from the host are compressed according to a compression method designated by the write command.

14. The method according to claim 10, further comprising:
independently maintaining an address mapping for each of a plurality of namespaces that is established in the storage device, wherein
the first data received from the host are compressed according to a compression method associated with a namespace designated by the write command.

15. The method according to claim 10, further comprising:
selecting a plurality of blocks of the nonvolatile storage as target blocks for garbage collection;
determining whether or not valid data stored in the selected blocks are compressed;
expanding and re-compressing the valid data when the valid data are determined to be compressed; and
copying the re-compressed valid data and other valid data from the selected blocks to another block.

16. The method according to claim 10, further comprising:
selecting a plurality of blocks of the nonvolatile storage as target blocks for garbage collection;
determining whether or not valid data stored in the selected blocks are compressed;
expanding and re-compressing the valid data when the valid data are determined to be compressed and an update frequency of the valid data is lower than a threshold; and
copying the re-compressed valid data and other valid data from the selected blocks to another block.

17. The method according to claim 10, further comprising:
counting a number of times data stored in each block of the nonvolatile storage have been copied through garbage collection; and
selecting a plurality of blocks for which counted numbers are equal as target blocks for garbage collection;
determining whether or not valid data stored in the selected blocks are compressed;
expanding and re-compressing the compressed valid data upon determining that the counted number for the target blocks is greater than a threshold; and copying the re-compressed valid data and other valid data from the selected blocks to another block.

* * * * *